US008537424B1

(12) United States Patent
Keithley et al.

(10) Patent No.: US 8,537,424 B1
(45) Date of Patent: Sep. 17, 2013

(54) ON-THE-FLY HALFTONE IMAGE GENERATION

(75) Inventors: Douglas G. Keithley, Boise, ID (US); Roy G. Moss, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 501 days.

(21) Appl. No.: 12/858,346

(22) Filed: Aug. 17, 2010

Related U.S. Application Data

(60) Provisional application No. 61/236,030, filed on Aug. 21, 2009.

(51) Int. Cl.
*H04N 1/40* (2006.01)
*H04N 1/60* (2006.01)
*H04N 1/52* (2006.01)

(52) U.S. Cl.
USPC ......... 358/3.23; 358/3.22; 358/3.09; 358/534

(58) Field of Classification Search
None
See application file for complete search history.

(56) References Cited

U.S. PATENT DOCUMENTS 4,185,304 A * 1/1980 Holladay ....................... 358/3.2
7,450,269 B2 * 11/2008 Tai et al. ...................... 358/3.09

* cited by examiner

*Primary Examiner* — Barbara Reinier

(57) ABSTRACT

Some of the embodiments of the present disclosure provide a method comprising forming an array comprising a plurality of microcells, each microcell of the plurality of microcells including a plurality of pixels; for each pixel in each of the plurality of microcells, assigning (i) a respective pixel offset factor that is associated with a relative position of the pixel in the respective microcell, and (ii) a respective microcell offset factor that is associated with an index of the respective microcell; and for each pixel in each of the plurality of microcells, determining a respective final offset factor that is based at least in part on the respective pixel offset factor and the respective microcell offset factor. Other embodiments are also described and claimed.

23 Claims, 17 Drawing Sheets

| | | | |
|---|---|---|---|
| 0 | 0 | 0 | 0 |
| 0 | 0 | 0 | 0 |

0,1,2,3     Fig. 6a

| | | | |
|---|---|---|---|
| 1 | 0 | 0 | 0 |
| 0 | 0 | 0 | 0 |

4     Fig. 6b

| | | | |
|---|---|---|---|
| 1 | 1 | 0 | 0 |
| 0 | 0 | 0 | 0 |

5     Fig. 6c

| | | | |
|---|---|---|---|
| 1 | 1 | 0 | 0 |
| 0 | 1 | 0 | 0 |

6     Fig. 6d

| | | | |
|---|---|---|---|
| 1 | 1 | 0 | 0 |
| 1 | 1 | 0 | 0 |

7     Fig. 6e

| | | | |
|---|---|---|---|
| 7 | 7 | 0 | 0 |
| 6 | 7 | 0 | 0 |

| | | | | |
|---|---|---|---|---|
| 59 | 14 | 14 | 0 | 0 |
| | 14 | 14 | 0 | 0 |

Fig. 6g

| | | | | |
|---|---|---|---|---|
| 60 | 15 | 14 | 0 | 0 |
| | 14 | 14 | 0 | 0 |

Fig. 6h

| | | | | |
|---|---|---|---|---|
| 61 | 15 | 15 | 0 | 0 |
| | 14 | 14 | 0 | 0 |

Fig. 6i

| | | | | |
|---|---|---|---|---|
| 62 | 15 | 15 | 0 | 0 |
| | 14 | 15 | 0 | 0 |

Fig. 6j

| | | | | |
|---|---|---|---|---|
| 63,64, 65 | 15 | 15 | 0 | 0 |
| | 15 | 15 | 0 | 0 |

Fig. 6k

| 66 | 15 | 15 | 0 | 1 |
|---|---|---|---|---|
|    | 15 | 15 | 0 | 0 |

Fig. 6l

| 67 | 15 | 15 | 0 | 1 |
|---|---|---|---|---|
|    | 15 | 15 | 0 | 1 |

Fig. 6m

| 68 | 15 | 15 | 0 | 2 |
|---|---|---|---|---|
|    | 15 | 15 | 0 | 1 |

Fig. 6n

| 94 | 15 | 15 | 0 | 15 |
|---|---|---|---|---|
|    | 15 | 15 | 0 | 14 |

Fig. 6o

| 95,96 | 15 | 15 | 0 | 15 |
|---|---|---|---|---|
|       | 15 | 15 | 0 | 15 |

97

| | | | |
|---|---|---|---|
| 15 | 15 | 0 | 15 |
| 15 | 15 | 1 | 15 |

| | | | |
|---|---|---|---|
| 15 | 15 | 0 | 15 |
| 15 | 15 | 14 | 15 |

Fig. 6r 111,112

| | | | |
|---|---|---|---|
| 15 | 15 | 0 | 15 |
| 15 | 15 | 15 | 15 |

| | | | |
|---|---|---|---|
| 15 | 15 | 1 | 15 |
| 15 | 15 | 15 | 15 |

| | | | |
|---|---|---|---|
| 15 | 15 | 2 | 15 |
| 15 | 15 | 15 | 15 |

| | | | |
|---|---|---|---|
| 15 | 15 | 3 | 15 |
| 15 | 15 | 15 | 15 |

| | | | |
|---|---|---|---|
| 15 | 15 | 15 | 15 |
| 15 | 15 | 15 | 15 |

Fig. 6w

Pixel offset table entries of Fig. 8b, multiplied by a multiplication factor of 1000

10a →

| | 65000 | |
|---|---|---|
| 64000 | 0 | 1000 |

| 3000 | 2000 | 96000 | 65000 | ← 10b |
| 112000 | 64000 | 0 | 1000 |

| | 3000 | 2000 | 96000 |
| | 112000 | | |

Final offset table of the primary u-cells 10a and 10b

10a →

| | 65001 | |
|---|---|---|
| 64001 | 1 | 1001 |

| 3001 | 2001 | 96001 | 65003 | ← 10b |
| 112001 | 64003 | 3 | 1003 |

| | 3003 | 2003 | 96003 |
| | 112003 | | |

| Pixel | Previous Row, Column | Change in Row | Change in Column |
|---|---|---|---|
| 5a | 1, 2 | 0 | +1 |
| 4a | 1, 2 | 0 | +1 |
| 3a | 2, 3 | -1 | 0 |
| 7a | 2, 3 | -1 | 0 |

| Pixel | Previous Row, Column | Change in Row | Change in Column |
|---|---|---|---|
| 4a | 1, 2 | 0 | +1 |
| 0a | 1, 2 | 0 | +1 |
| 5a | 0,3 | +1 | 0 |
| 6a | 0,3 | +1 | 0 |

ON-THE-FLY HALFTONE IMAGE GENERATION

CROSS REFERENCE TO RELATED APPLICATIONS

The present application claims priority to U.S. Patent Application No. 61/236,030, filed Aug. 21, 2009, the entire specification of which is hereby incorporated by reference in its entirety for all purposes, except for those sections, if any, that are inconsistent with this specification.

TECHNICAL FIELD

Embodiments of the present invention relate to halftone image generation in a printing device in general, and more specifically, to on-the-fly halftone image generation in the printing device.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In order to facilitate the printing of images in a printing device, an image having continuous tones (also referred to herein as a "continuous tone image" or a "contone image") is usually converted into an image having halftones. For example, a black & white picture is reproduced in a newspaper as a grid or array of black dots, with relatively lighter areas having smaller and/or less number of dots, and relatively darker areas having larger and/or more number of dots. For very dark areas of a halftone image, the larger spots run into one another so that the dark area looks like small white spots on a black field.

Commercial printing devices and typesetters are incapable of printing individual halftone dots in an infinite number of sizes. Instead, each dot of a picture usually comprises discrete smaller dots or pixels. A pixel is generally a smallest addressable portion of an image, and/or a smallest dot a printer or typesetter can make (although it may be possible to place a dot that occupies a portion of a pixel, and/or it may be possible to address a portion of a pixel), and, therefore, every dot may be collection of one or more pixels.

SUMMARY

In various embodiments, the present disclosure provides a method comprising forming an array comprising a plurality of microcells, each microcell of the plurality of microcells including a plurality of pixels; for each pixel in each of the plurality of microcells, assigning (i) a respective pixel offset factor that is associated with a relative position of the pixel in the respective microcell, and (ii) a respective microcell offset factor that is associated with an index of the respective microcell; and for each pixel in each of the plurality of microcells, determining a respective final offset factor that is based at least in part on the respective pixel offset factor and the respective microcell offset factor.

BRIEF DESCRIPTION OF THE DRAWINGS

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present disclosure is defined by the appended claims and their equivalents.

FIGS. 6*a*-6*w* illustrates a build-up table for various requested output levels.

DETAILED DESCRIPTION

Various operations may be described as multiple discrete operations in turn, in a manner that may be helpful in understanding embodiments of the present disclosure; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Figure 1:
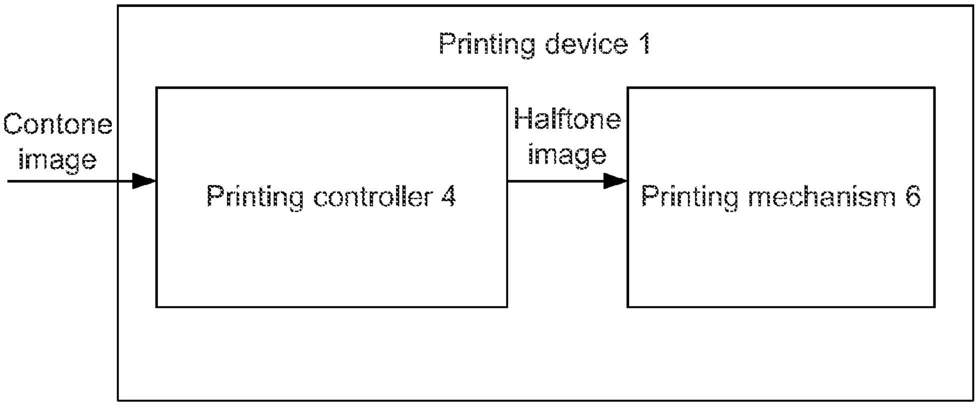
FIG. 1 schematically illustrates an example printing device.

FIG. 1 schematically illustrates an example printing device 1. The printing device 1 is any appropriate device (e.g., a monochrome printer, a color printer, a laser printer, an inkjet printer, and/or the like) that prints images on a printing medium (e.g., a paper). The printing device 1 includes a printing controller 4 that is configured to receive a contone image from an appropriate source (e.g., a computing device, a laptop, a desktop, a camera, an appropriate consumer electronics device, and/or the like, although not illustrated in FIG. 1). The printing controller 4 is further configured to generate a halftone image corresponding to the contone image. The printing device 1 also includes a printing mechanism 6 that is configured to receive the halftone image from the printing controller 4, and to print an image on the printing medium based at least in part on the received halftone image.

Although illustrated to be a part of the printing device 1, in various other embodiments, the printing controller 4 may be external to the printing device 1. In some of these embodiments, the printing controller 4 generates the halftone image from the contone image, and transmits the generated halftone image to the printing device 1 (e.g., to the printing mechanism 6).

In this disclosure, the contone image and the halftone image are assumed to be in grayscale. However, the teachings of this disclosure may easily be applied to color images as well. For example, the teachings of this disclosure may be used to generate halftone images corresponding to cyan, magenta, and/or yellow colors, thereby generating a colored halftone image corresponding to colored contone image.

Defining Microcells

Figure 2A:
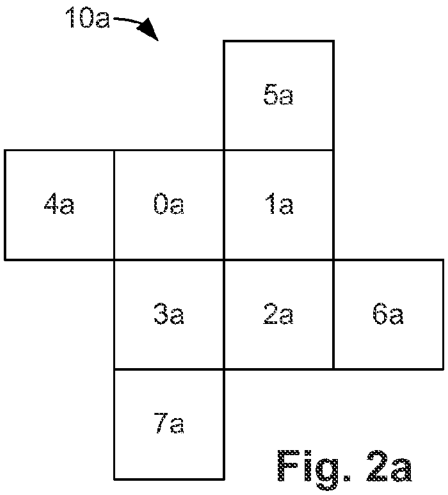
FIG. 2*a* schematically illustrates an example micro cell (also referred to as a "u-cell").

FIG. 2*a* schematically illustrates an example micro cell (u-cell) 10*a*. As discussed herein later in more detail, a halftone image includes several such u-cells. The u-cell 10*a* includes a plurality of pixels, labeled as pixel 0*a*, . . . , 7*a* in FIG. 2*a*.

Although the u-cell 10*a* includes eight pixels arranged in a specific order, such number and arrangement of the pixels is only an example, and in various other embodiments, the u-cell 10*a* can include any other appropriate number of pixels (e.g., 16 pixels, 99 pixels, 128 pixels, 195 pixels, 256 pixels, or the like) that are arranged in any other appropriate manner.

In various embodiments, the u-cell 10*a* is configured to represent one of nine possible shades of gray level. For example, in the u-cell 10*a*, none of the pixels (e.g., 0% gray), only one pixel, two pixels, . . . , or all eight pixels (e.g., 100% gray) can be darkened, based at least in part on a gray level of the contone image. Thus, as more number of pixels in the u-cell 10*a* is darkened, a size of a dot represented by the u-cell 10*a* increases, thereby increasing a gray level associated with the u-cell 10*a*.

In various embodiments, rather than darkening a random pixel for every increase in gray level, the pixels in the u-cell 10 are darkened in a specific order. For example, the pixel 0*a* may be darkened first, then pixel 1*a* may be darkened, and so on, until a desired darkness level (or a desired size of a dot represented by the u-cell 10*a*) is reached. In various embodiments, the order of darkening pixels in FIG. 2*a* reflects a spot function which attempts to maintain a generally circular shape as the dot increases in size.

In various embodiments, each pixel in the u-cell 10*a* is associated with a threshold value, which corresponds to a gray level at which that pixel (or at least a part of that pixel) is darkened. For example, if a dot which represents a gray level of 75% is desired, the dot is created by darkening every pixel in the u-cell 10*a* that has a threshold value less than or equal to a value corresponding to the 75% gray level, as will be explained in more detail herein later.

Figure 2B:
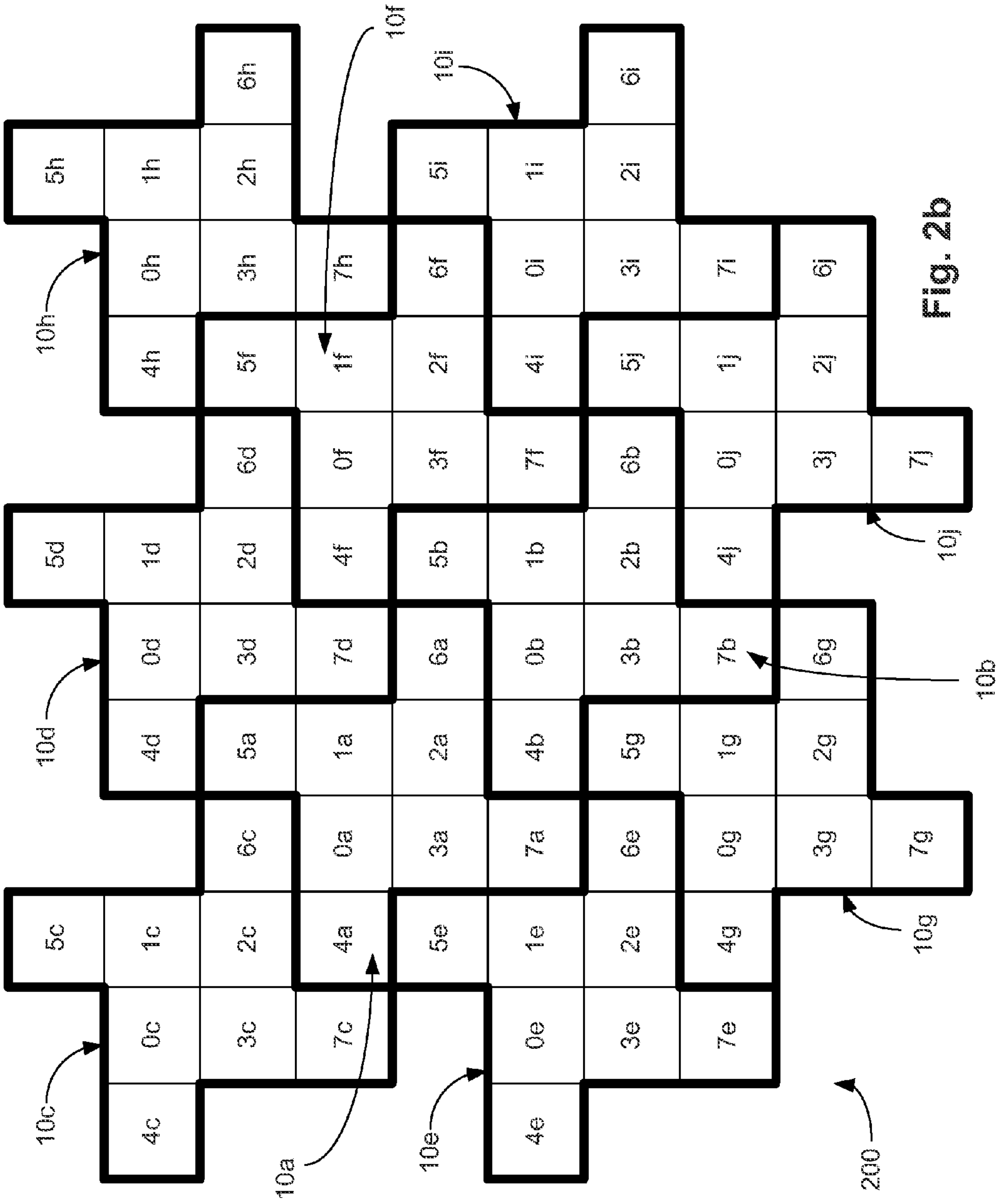
FIG. 2*b* schematically illustrates an example array that includes a plurality of u-cells.

FIG. 2*b* schematically illustrates an example array 200 that includes a plurality of u-cells. In FIG. 2*b*, boundaries of individual u-cells are illustrated in thicker lines compared to lines used to illustrate boundaries of individual pixels included in the u-cells.

The array 200 includes the u-cell 10*a* of FIG. 2*a*. Furthermore, the array 200 includes nine other u-cells 10*b*, . . . 10*j*, each of which has a number and arrangement of pixels that are similar to those in the u-cell 10*a*. For example, u-cell 10*b* includes pixels 0*b*, 1*b*, . . . , 7*b*; u-cell 10*c* includes pixels 0*c*, 1*c*, . . . , 7*c*, and so on.

In various embodiments, the pixels in individual u-cells 10*a*, . . . , 10*d* are arranged such that the u-cells tessellate. That is, the u-cells 10*a*, . . . , 10*j* have shapes such that the u-cells tessellate. For example, collection of the u-cells 10*a*, . . . , 10*j* fills a plane (e.g., the array 200) without any overlaps and/or gaps. Although the example array 200 of FIG. 2*b* includes only ten u-cells, the array 200 may include any other number of u-cells as wells.

Figure 3:
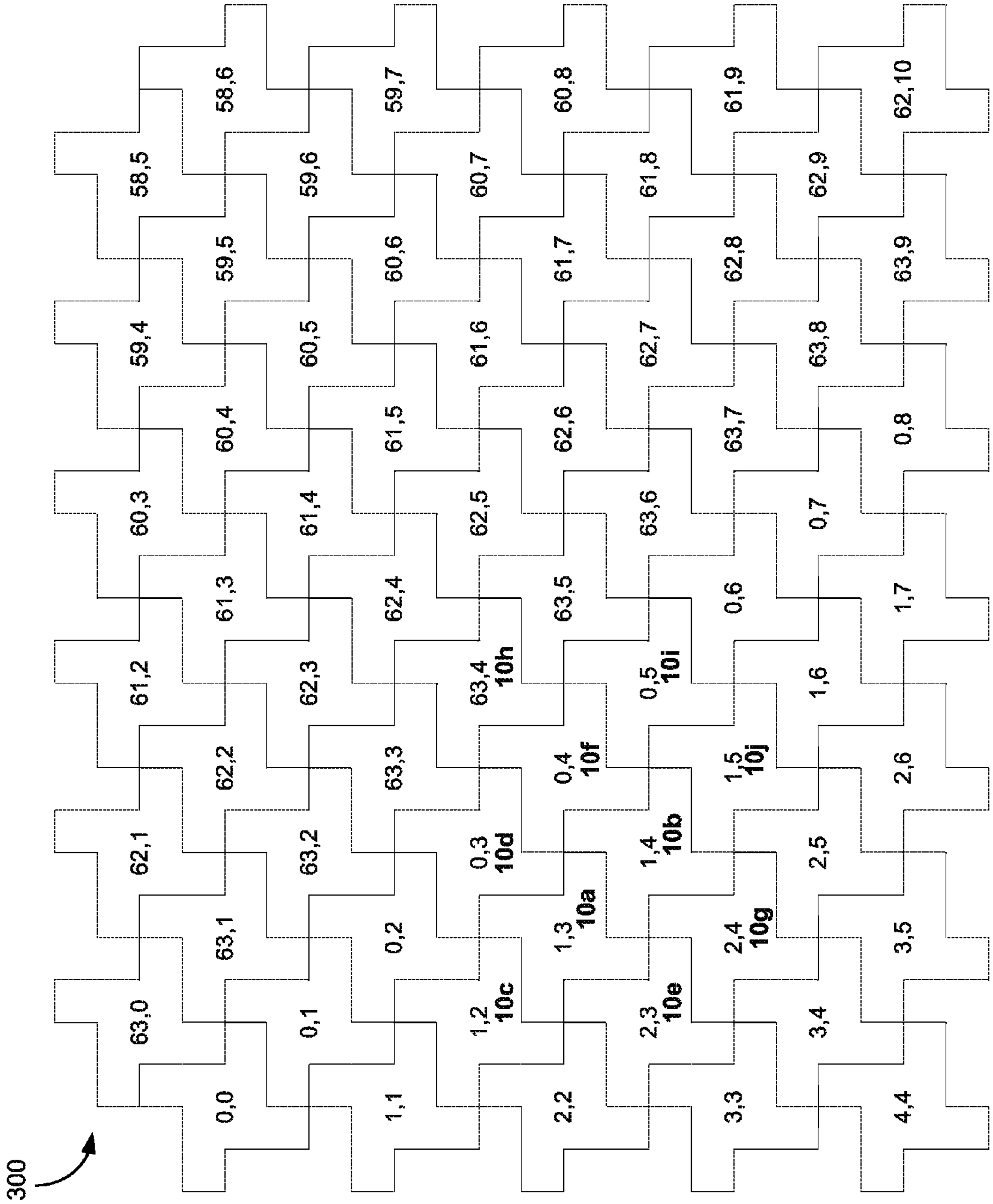
FIG. 3 schematically illustrates a portion of an example array that includes a plurality of u-cells.

FIG. 3 schematically illustrates a portion of an example array 300 that includes a plurality of u-cells. In various embodiments, the array 300 includes 64 by 64 u-cells, although only a few of the 64 by 64 u-cells are illustrated in FIG. 3 for the purpose of illustrative clarity. Each u-cell in the array 300 has a number and arrangement of pixels that are similar to those in the u-cell 10*a*. For the purpose of illustrative clarity, individual pixels in the u-cells of the array 300 are not separately illustrated. The 64 by 64 u-cells in the array 300 tessellate.

The array 300 includes u-cells 10*a*, . . . , 10*j* of FIG. 2*b* (i.e., the array 300 includes the array 200), as illustrated in FIG. 3. Other u-cells in the array 300 are not labeled separately for purpose of illustrative clarity.

In FIG. 3, the u-cells of the array 300 are labeled based at least in part on an x coordinate and a y coordinate of the array 300. For example, the u-cell 10*a* has a coordinate of 1,3 (i.e., x coordinate of 1, and y coordinate of 3); the u-cell 10*b* has a coordinate of 1,4; the u-cell 10*c* has a coordinate of 1,2; and so on. In FIG. 3, the x and y plane of the array 300 are at 45° angle with respect to a horizontal and vertical plane of FIG. 3. Thus, u-cells that lie on a line that is at a 45° angle with respect to the horizontal plane of FIG. 3 have the same y coordinate, and u-cells that lie on a line that is at a −45° angle with respect to the horizontal plane have the same x coordinate. For example, u-cells 10*a*, 10*d* and 10*e* lie on a line that is at a 45° angle with respect to the horizontal plane of FIG. 3, and accordingly, have the same y coordinate of 3. Similarly, u-cells 10*c*, 10*a*, 10*b* and 10*j* lie on a line that is at a −45° angle with respect to the horizontal plane of FIG. 3, and accordingly, have the same x coordinate of 1.

In various embodiments, a plurality of arrays of u-cells (where each array is similar to the array 300 of FIG. 3) is used to represent the halftone image of FIG. 1, corresponding to the contone image. Thus, the halftone image includes a plurality of arrays of u-cells (e.g., the array 300 of FIG. 3), each array of u-cells including a plurality of u-cells (e.g., u-cells 10*a*, . . . , 10*j*, etc. of FIG. 3), and each u-cell including a plurality of pixels (e.g., pixels 0*a*, . . . , 7*a* of u-cell 10*a*). To create the halftone image, the contone image is broken down into a plurality of pixel sized contone samples, and the gray level of each contone sample is determined. Each contone sample corresponds to a respective array of u-cells in the halftone image. Next, a contone sample is compared with the threshold values of pixels included in the corresponding array of u-cells, and the pixels in the corresponding array of u-cells are selectively darkened based at least in part on the gray level of the contone sample. The process is repeated for all the contone samples to generate the halftone image of the contone image.

For the purpose of this disclosure and unless otherwise mentioned, the u-cells 10*a*, . . . , 10*j* and other u-cells illustrated in array 300 are henceforth also referred to as primary u-cells (reasons behind such naming will be discussed herein later).

Secondary U-Cells

Figure 4A:
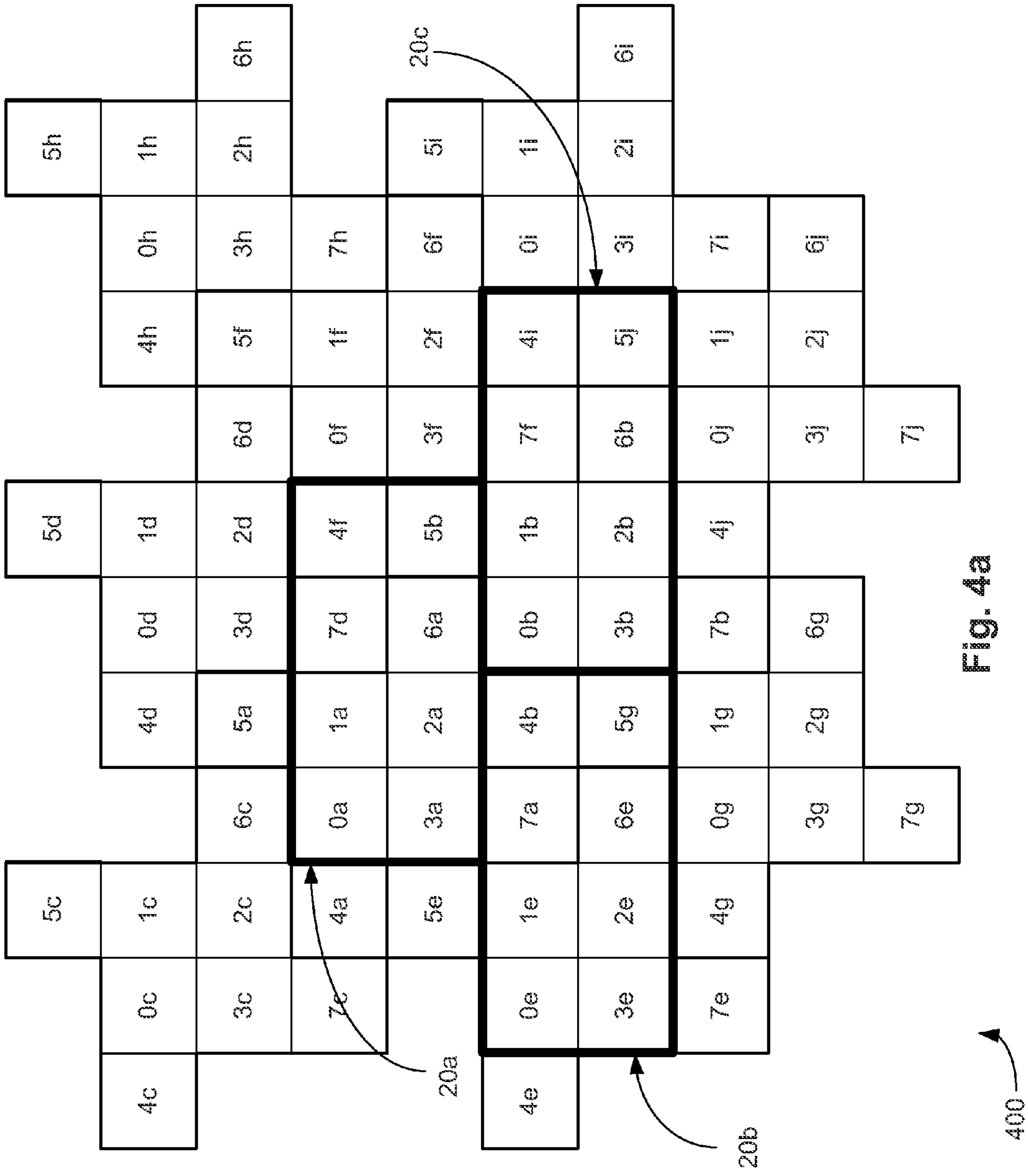
FIG. 4*a* schematically illustrates an example array that illustrates a plurality of secondary u-cells.

FIG. 4*a* schematically illustrates an example array 400 that illustrates a plurality of secondary u-cells. The array 400 of FIG. 4*a* is same as the array 200 of FIG. 2*b*. For example, both the arrays 200 and 400 includes same pixels (e.g., pixels 0*a*, 1*a*, . . . , 7*j*), arranged in similar manner. Also, although not separately identified (e.g., identified using thick lines) in FIG. 4*a* for the purpose of illustrative clarity, the array 400 includes primary u-cells 10*a*, . . . , 10*j*, similar to those in the array 200 of FIG. 2*b*.

In the array 400, individual pixels are also grouped to form various secondary u-cells 20*a*, 20*b* and 20*c*. The secondary u-cells are formed using pixels of various primary u-cells. For example, secondary u-cell 20*a* includes pixels 0*a*, 1*a*, 2*a*, 3*a* and 6*a*, all of which are also included in the primary u-cell 10*a* (see FIG. 2*b*). Secondary u-cell 20*a* also includes pixel 7*d* of primary u-cell 10*d*, pixel 4*f* of primary u-cell 10*f*, and pixel 5*b* of primary u-cell 10*b* (see FIG. 2*b*). Thus, the secondary u-cells of array 400 are formed by merely re-defining pixel boundaries of the array 200. The array 400 also includes several other secondary u-cells (at least several other partial secondary u-cells), although these are not illustrated in FIG. 4*a* for the purpose of illustrative clarity.

Henceforth in this disclosure, u-cells are identified as primary u-cells or secondary u-cells. Also, henceforth in this disclosure, a u-cell that is not specifically identified as primary or secondary can be a primary and/or a secondary u-cell.

Although not illustrated in any of the figures, u-cell boundaries of the array 300 of FIG. 3 may also be redefined to create a plurality of secondary u-cells from the illustrated primary u-cells of the array 300. For example, although not illustrated, the array 300 may include 64 by 64 secondary u-cells, each of which is similar (e.g., includes same number and arrangement of pixels) to each of the secondary u-cells 20*a*, . . . , 20*c* of FIG. 4*a*.

Although individual secondary u-cells of FIG. 4*a* includes two by four pixels, in various other embodiments, individual secondary u-cells of FIG. 4*a* may include any other number and/or arrangement of pixels.

Referring again to FIGS. 2*a*-4, although the primary u-cells may have any shape, it is possible to form rectangular shaped secondary u-cells (e.g., u-cells 20*a*, . . . , 20*c*) from the primary u-cells by redefining the primary u-cell boundaries. That is, for most shapes of the primary u-cells (but as long as the primary u-cells tessellate), rectangular shaped secondary u-cells can be formed from the primary u-cells by redefining the primary u-cell boundaries. Similar to the primary u-cells, the secondary u-cells also have tessellation property.

Figure 4B:
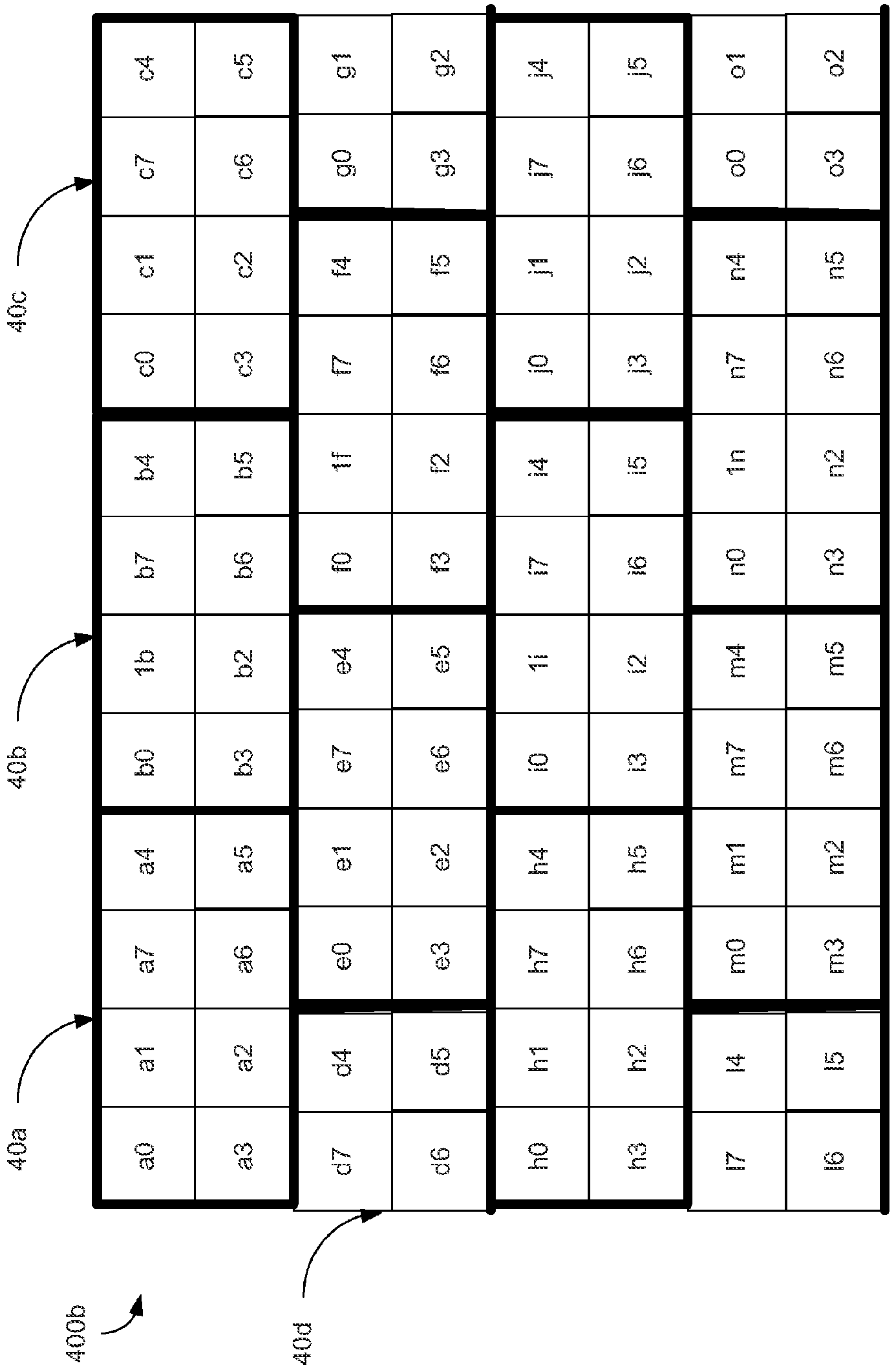
FIG. 4*b* schematically illustrates an example array that includes a plurality of secondary u-cells.

FIG. 4*b* schematically illustrates an example array 400*b* that includes a plurality of secondary u-cells. In FIG. 4*b*, boundaries of individual secondary u-cells are illustrated in thicker lines compared to lines used to illustrate boundaries of individual pixels included in the secondary u-cells. Only four secondary u-cells 40*a*, . . . , 40*d* are labeled in FIG. 4*b*, although FIG. 4*b* includes several other secondary u-cells. Each secondary u-cell of array 400*b* are similar (e.g., includes similar number and arrangement of pixels) to the secondary u-cells illustrated in FIG. 4*a*. Thus, in FIG. 4*b*, individual secondary u-cells have a height of two pixels, and a width of four pixels.

In various embodiments, the array 400*b* is a part of the array 300. The pixels in the array 400*b* are labeled based on their affiliation with the respective secondary u-cells. For example, pixels a0, . . . , a7 are included in the secondary u-cell 40*a*; pixels b0, . . . , b7 are included in the secondary u-cell 40*b*, and so on. Although the pixels in the array 400*b* can also be arranged and/or labeled based on primary u-cell boundaries, such arrangement is not illustrated in FIG. 4*b* for the purpose of illustrative clarity.

Grouping of Pixels

Figure 5A:
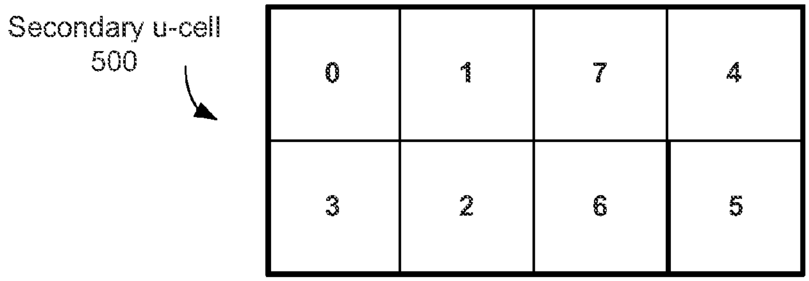
FIG. 5*a* schematically illustrates an example secondary u-cell.

FIG. 5*a* schematically illustrates an example secondary u-cell 500. The secondary u-cell 500 is similar (e.g., includes similar number and arrangement of pixels) to individual secondary u-cells illustrated in FIGS. 4*a* and 4*b*. For the sake of generality, the pixels of the secondary u-cell 500 is labeled as pixel 0, . . . , pixel 7.

The pixels in the secondary u-cell 500 are divided in one or more groups. In an embodiment, a number of pixels in a group of pixels are a power of 2, although any other number of pixels can also be included in the group of pixels. Thus, a group of pixels may have 1 pixel, 2 pixels, 4 pixels, and so on.

Figure 5B:
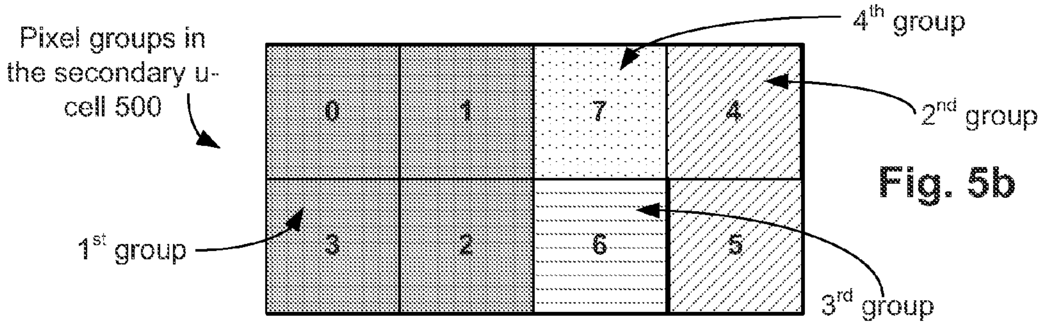
FIG. 5*b* schematically illustrates grouping of pixels of the secondary u-cell of FIG. 5*a*.

For example, as illustrated in FIG. 5*b*, the pixels in the secondary u-cell 500 are divided in four different groups. In FIG. 5*b*, each group is illustrated using distinct color and/or shading. For example, in the secondary u-cell 500 of FIG. 5*b*, a first group of pixels (illustrated using light gray color) includes pixels 0, 1, 2 and 3; a second group of pixels (illustrated using diagonal lines) includes pixels 4 and 5; a third group of pixels (illustrated using horizontal lines) includes pixel 6; and a fourth group of pixels (illustrated using small dots) includes pixel 7. In various other embodiments, the pixels may be grouped in a different manner.

In various embodiments, pixels that are grouped together grow together when a dot representing a u-cell grows larger in size. For example, for a relatively light gray contone image, at least a part of pixel 0 of the secondary u-cell 500 is darkened. As the gray level of the contone image increases, at least a part of pixel 1, pixel 2 and pixel 3 are darkened. Thus, the first group of pixels (comprising pixels 0, . . . , 3) of the secondary u-cell 500 are first darkened, before darkening pixels of any other group. After pixels in the first group of pixels are completely darkened, pixels of the second group of pixels (comprising pixels 4 and 5) are darkened, as the gray level of the contone image keeps on increasing. After pixels in the second group of pixels are completely darkened, pixel 6 of the third group of pixels is darkened, followed by darkening of pixel 7 of the fourth group of pixels.

Figure 5C:
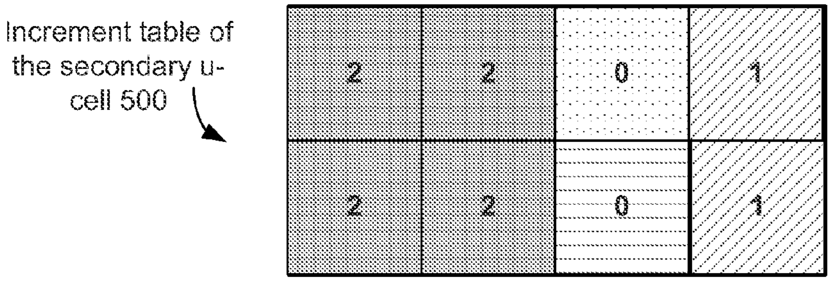
FIG. 5*c* illustrates an increment table for the pixels in the secondary u-cell of FIG. 5*a*.

FIG. 5*c* illustrates an increment table for the pixels in the secondary u-cell 500. The increment table of FIG. 5*c* includes an increment (Inc) value corresponding to each of the pixels in the secondary u-cell 500. In various embodiments, the Inc value of a pixel is equal to a logarithmic value, with base 2, of a number of pixels in a group to which the pixel is associated with. For example, the first group of pixels include pixels 0, 1, 2 and 3, and accordingly, the Inc value of each of these pixels is $\log_2(4)$, i.e., equal to 2. Similarly, the second group of pixels include pixels 4 and 5, and accordingly, the Inc value of each of these pixels is $\log_2(2)$, i.e., equal to 1. The third group of pixels include pixel 6 only, and accordingly, the Inc value of pixel 6 is $\log_2(1)$, i.e., equal to 0. The fourth group of pixels include pixel 7 only, and accordingly, the Inc value of pixel 7 is $\log_2(1)$, i.e., equal to 0, as illustrated in the increment table of FIG. 5*c*.

Some printing devices (e.g., a laser printer) may not be able to place an isolated dot comprising, for example, half a pixel, or a quarter of a pixel, a full pixel, etc. If such printing devices cannot place a single pixel, the dots may have to start at more than one pixel (e.g., one and a half, or more pixels) in size. In some of these printing devices, a pixel adjacent to a 100% filled pixel may be partially darkened by the printing device. For example, a pixel adjacent to a 100% filled pixel may be partially darkened by a printing device at an increment of $1/15^{th}$ of a single pixel. That is, the printing device may fully darken one pixel, and darken $1/15^{th}$ or $2/15^{th}$ portion of a pixel that is adjacent to the fully darken pixel. Such printing devices may use clustered dot type halftoning, because they typically have trouble with placing isolated dots at or below the printer resolution, but can grow a dot (e.g., make the dot larger) in very precise increments.

For the purpose of this disclosure and unless otherwise mentioned, a pulse width (PW) of a pixel is associated with a resolution of a printing device (e.g., printing device 1 of FIG. 1) that is configured to generate and print the halftone image. The printing device 1 generates and prints at increments of 1/(PW-1) of a pixel. Thus, if the PW=m, where m is an integer, then the printing device 1 generates and prints at increments of 1/(m−1) of a pixel. That is, the printing device 1 generates and prints 0/(m−1), 1/(m−1), 2/(m−1), . . . , and/or (m−1)/(m−1) portion of a pixel. For example, if the PW value is 16, the printing device 1 can generate and print no pixel at all (i.e., $0/15^{th}$ of a pixel), $1/15^{th}$ of a pixel, $2/15^{th}$ of a pixel, and so on. Thus, in an example, the printing device 1 may print the entire pixel 0, and $2/15^{th}$ of the adjacent pixel 1 of the secondary u-cell 500, based at least in part on a gray level of the contone image.

Based at least in part on an order and grouping of the pixels in the secondary u-cell 500, a pixel offset table for the pixels of the secondary u-cell 500 is generated. The generation of the pixel offset table is also based at least in part on the PW value of the printing device 1. For generation of an example pixel offset table discussed below, the PW value is assumed to be 16, although such assumption does not impose any limit on the inventive principles of this disclosure.

Figure 5D:
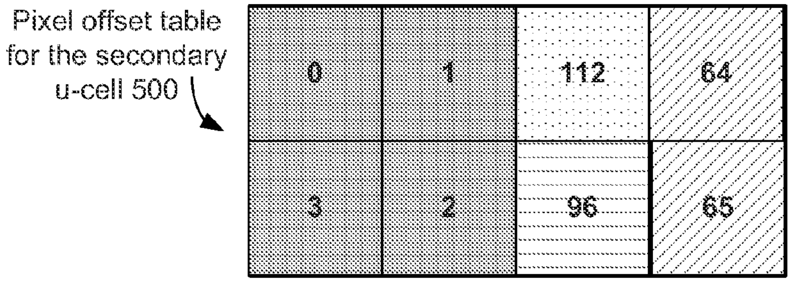
FIG. 5*d* illustrates a pixel offset table for the secondary u-cell of FIG. 5*a*.

While generating the pixel offset table for the secondary u-cell 500, for each group of pixels in the secondary u-cell 500, the pixel with the smallest number is selected and multiplied by the PW value to determine an offset value corresponding to the pixel with the smallest number. Offset values for remaining pixels in each group of pixels are then determined by incrementing the offset value of the pixel with smallest number in that group. FIG. 5*d* illustrates a pixel offset table for the secondary u-cell 500. For the purpose of this disclosure and unless otherwise disclosed, the entries of the pixel offset table of FIG. 5*d* are also referred to as pixel offset factors. As will de disclosed in more detail herein later, in various embodiments, the pixel offset factors are associated with an order in which individual pixels within a microcell are darkened while generating halftone images.

For example, for the first group of pixels (which includes pixels 0, . . . , 3, as illustrated in FIG. 5*b*), the pixel with the smallest value is pixel 0. Accordingly, the pixel offset factor for pixel 0 is 16×0, i.e., 0 (as PW value for this example is 16), as illustrated in the pixel offset table of FIG. 5*d*. Pixel offset factors for pixels 1, 2 and 3 are determined by incrementing the pixel offset factor corresponding to pixel 0. Accordingly, pixel offset factors for pixels 1, 2 and 3 are 1, 2 and 3, respectively, as illustrated in the pixel offset table of FIG. 5*d*.

For the second group of pixels (which includes pixels 4 and 5, as illustrated in FIG. 5*b*), the pixel with the smallest value is pixel 4. Accordingly, the pixel offset factor for pixel 4 is 16×4, i.e., 64, as illustrated in the pixel offset table of FIG. 5*d*. Pixel offset factor for pixel 5 is determined by incrementing the pixel offset factor corresponding to pixel 4. Accordingly, pixel offset factor for pixel 5 is 65, as illustrated in the pixel offset table of FIG. 5*d*.

Similarly, for the third group of pixels (which includes only pixel 6, as illustrated in FIG. 5*b*), the pixel with the smallest value is pixel 6. Accordingly, the pixel offset factor for pixel 6 is 16×6, i.e., 96, as illustrated in the pixel offset table of FIG. 5*d*. As the third group of pixels includes only a single pixel, pixel offset factor for remaining pixels for the third group of pixels is not determined.

Similarly, for the fourth group of pixels (which includes only pixel 7, as illustrated in FIG. 5*b*), the pixel with the smallest value is pixel 7. Accordingly, the pixel offset factor for pixel 6 is 16×7, i.e., 112, as illustrated in the pixel offset table of FIG. 5*d*. As the fourth group of pixels includes only a single pixel, pixel offset factor for remaining pixels for the fourth group of pixels is not determined.

As the entries of the pixel offset table of FIG. 5*d* are based at least in part on relative positions and/or numbering of pixels in the secondary u-cell 500, the table of FIG. 5*d* is specifically termed as "pixel" offset table, and the entries of the pixel offset table are specifically termed as "pixel" offset factors.

Figure 5E:
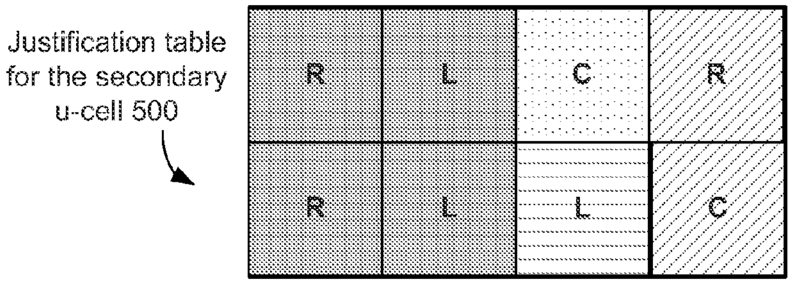
FIG. 5*e* illustrates a justification table for the secondary u-cell of FIG. 5*a*.

FIG. 5*e* illustrates a justification table for the secondary u-cell 500. Referring to FIGS. 5*a*, 5*b* and 5*e*, the pixels 0, 3 and 4 are right justified, pixels 1, 2 and 6 are left justified, and pixels 5 and 7 are center justified. For example, if only 50% of the pixel 0 is to be darkened by the printing device 1, then the right 50% of the pixel 0 is to be darkened (as pixel 0 is right justified). Similarly, if only 47% of the pixel 6 (i.e., $7/15^{th}$ of the pixel, with a PW value of 16) is to be darkened by the printing device 1, then the left 47% of the pixel 6 is to be darkened (as pixel 6 is left justified). Similarly, if only 13% of the pixel 6 (i.e., $2/15^{th}$ of the pixel, with the PW value of 16) is to be darkened by the printing device 1, then the left 13% of the pixel 6 is to be darkened (as pixel 6 is left justified). The justification values (i.e., right, left or center) of the pixels are determined such that the growth of pixels is in an organized and coherent manner. For example, the justification values of pixels 0, 1, 2 and 3 are determined such that a dot associated with these pixels grows toward the center of pixels 0, . . . , 3. Determination of the justification values will be discussed in more detail herein later.

Build-up tables

Figures 6Q, 6R, 6S, 6T, 6U, 6V, 6W:
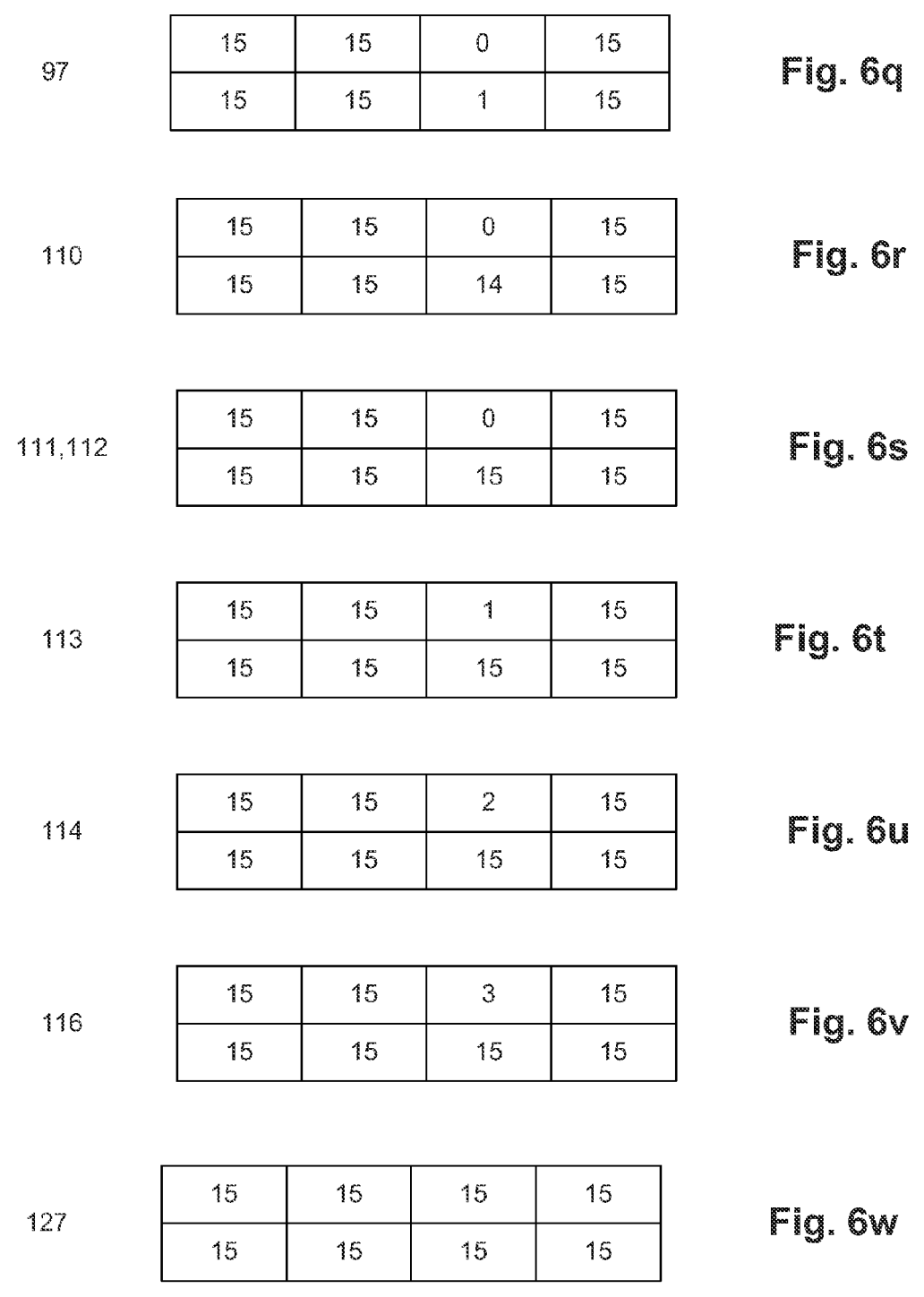

In various embodiments, the pixel offset table of FIG. 5*d* may act as a threshold table while generating build-up tables for the halftone image corresponding to the contone image. FIGS. 6*a*-6*w* illustrates build-up tables corresponding to various possible gray levels of the contone image. In various embodiments, the build-up tables illustrate a desired normalized pulse width value that is to be generated for pixel locations if input pixels all have the same incoming tone request value. The build-up tables are constructed on the fly (e.g., instead of being saved in a memory) by the printing device 1, upon receiving the contone image and while generating the corresponding halftone image. As will be discussed in detail here later, individual build-up tables of FIGS. 6*a* to 6*w* illustrate an output if all of the input pixels had a same value (i.e., a build-up table illustrates a result of a halftone image with a constant gray value). The build-up tables include numbers that are compared to the incoming pixels on the fly while generating the halftone image.

While converting the contone image to the halftone image, a gray level of a portion of the contone image is compared to a threshold value. As previously discussed, the printing device 1 can generate and print at increments of 1/(PW−1) of a pixel. For example, if the PW value is 16, the printing device 1 can generate and print $1/15^{th}$ of a pixel, $2/15^{th}$ of a pixel, and so on. Thus, each pixel can represent 16 possible gray levels (e.g., 0% of the pixel being dark, $1/15^{th}$ of the pixel being dark, $2/15^{th}$ of the pixel being dark, . . . , the full pixel being dark). Accordingly, as the microcell 500 of FIG. 5*a* has 8 pixels, the microcell 500 can possibly have 8×16, i.e., 128 gray levels (i.e., PW value multiplied by the number of pixels in the secondary u-cell 500). However, as 0% of a pixel being dark is also counted as a gray level of the pixel, the actual number of different possible gray levels represented by the u-cell 500 is (1+8*(PW−1)), i.e., 121 possible gray levels (for PW value of 16). This is because 0 is also counted as a level, and this value is not affected by the number of pixels. Each pixel, thus, gives (PW−1) new levels that are not 0.

Thus, while generating the build-up tables, a number of possible gray levels of the contone image are normalized such that the gray level of the contone image has 128 possible states. The gray level of a portion of the contone image is then compared to the pixel offset table of the u-cell 500 (see FIG. 5*d*). The gray level of the portion of the contone image, which corresponds to the u-cell 500, is hereinafter also referred to as a requested output level. In FIGS. 6*a*-6*w*, the number in the left side of each table illustrates a corresponding requested output level. As discussed, the requested output level can range from 0 to 127, build-up tables corresponding to only a few of which are illustrated in FIGS. 6*a*-6*w*.

To construct the build-up tables of FIGS. 6*a*-6*w*, the requested output level is compared with the pixel offset factors of each pixel of the u-cell 500 (the pixel offset factors of each pixel of the u-cell 500 are illustrated in FIG. 5*d*) to determine a difference value corresponding to each pixel. Pixels for which the difference values are negative or zero have a zero entry in the build-up tables. For each pixel that has a positive difference value, the difference value is normalized by a number of pixels in the corresponding group. That is, the positive difference value corresponding to a pixel is divided by a number of pixels in the corresponding group of pixels. If the normalized value is a fraction, the fraction is rounded off to the largest integer that is smaller than the fraction (e.g., the fraction is rounded off using a floor function). For example, if the fraction is 0.25, the fraction is rounded off to 0; if the fraction is 1.75, the fraction is rounded off to 1; and so on. In another embodiment, instead of the fraction being rounded off to the largest integer that is smaller than the fraction (i.e., instead of using the floor function), the fraction can also be rounded off to the nearest integer (i.e., the fraction 1.75 is rounded off to 2), or can be rounded off using any other appropriate technique.

For example, FIG. 6*a* illustrates a build-up table for requested output levels of 0, 1, 2 and/or 3. For a requested output level of, for example, 2, the difference value between the requested output level 2 and the pixel offset factors of each pixel (as illustrated in FIG. 5*b*) are determined. The difference values between the requested output level 2 and the pixel offset factors corresponding to pixels 2, . . . , 7 are either zero or negative, and accordingly, the entries corresponding to these pixels in the build-up table of FIG. 6*a* are zero. The difference values between the requested output level 2 and the pixel offset factors corresponding to pixels 0 and 1 are 2 and 1, respectively. When normalizing the difference values by the number of pixels (i.e., 4) in the first group to which pixels 0 and 1 belong, the normalized differences are 0.5 and 0.25, respectively. These normalized differences are rounded off to the largest integers that are smaller than 0.5 and 0.25, respectively. Accordingly, the normalized differences for both pixels 0 and 1 are rounded off to 0. Accordingly, all entries of the build-up table are zero for the requested output level of 2.

Similarly, all entries of the build-up table are zero for the requested output levels of 0, 1 and 3, as will be readily understood by those skilled in the art based on the teachings of this disclosure.

FIG. 6*b* illustrates a build-up table for a requested output level of 4. The difference values between the requested output level of 4 and the pixel offset factors corresponding to pixels 4, . . . , 7 are negative, and accordingly, the entries corresponding to these pixels in the build-up table of FIG. 6*b* are zero. The difference values between the requested output level 4 and the pixel offset factors corresponding to pixels 0, . . . , 3 are 4, . . . , 1, respectively. When normalizing these difference values by the number of pixels (i.e., 4) in the first group to which pixels 0, . . . 3 belong, the normalized differences for pixels 0, . . . , 3 are 1, 0.75, 0.5 and 0.25, respectively. These normalized difference values are rounded off to the largest integers that are smaller than these differences. Accordingly, the normalized difference values for pixels 0, . . . , 3 are rounded off to 1, 0, 0 and 0, respectively. Thus, in FIG. 6*b*, all entries of the build-up table, expect for the entry corresponding to pixel 0, are zero for the requested output level of 4. The entry corresponding to pixel 0 is 1.

FIGS. 6*c*, . . . , 6*w* illustrate build-up tables for various requested output levels. These build-up tables are generated in a manner similar to generating the build-up tables of FIGS. 6*a* and 6*b*, and hence, a detailed description of generating the build-up tables of FIGS. 6*c*, . . . , 6*w* are not discussed in detail herein.

Referring to FIGS. 6*a*-6*k*, the pixels 0, . . . , 4 in the first group of pixels grow together in increments. For example, for the requested output level of 61, as illustrated in FIG. 6*i*, the entries for pixels 4, . . . , 8 are all zeros, while the entries for pixels 0, . . . , 3 are 15, 15, 14 and 14, respectively. Accordingly, for the requested output level of 61, entire portions of pixels 0 and 1 are darkened, $14/15^{th}$ portions of both pixels 2 and 3 are darkened, while the pixels 4, . . . , 7 are not darkened at all.

Figure 7:
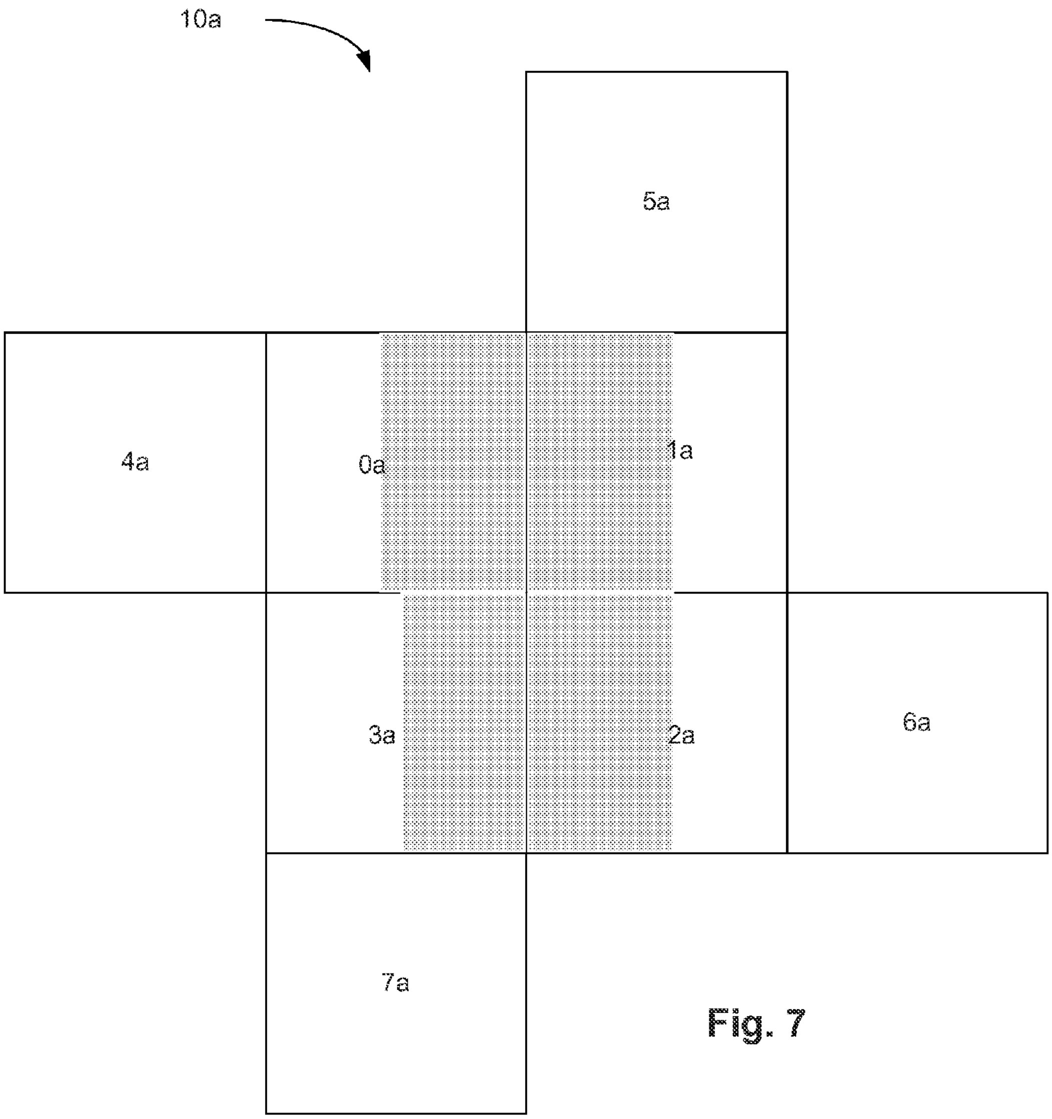
FIG. 7 illustrates darkening of various pixels of a primary u-cell for a specific requested output level.

In another example, FIG. 6*f* illustrates a build-up table for a requested output level of 30. FIG. 7 illustrates darkening of various pixels of the primary u-cell 10*a* (see FIG. 2*a*) for the requested output level of 30. Here, it is assumed that the pixels 0, . . . , 3 of secondary u-cell 500 map to pixels 0*a*, . . . , 3*a* of the primary u-cell 10*a*. As illustrated in FIG. 7, for this requested output level, $7/15^{th}$ portion of pixels 0*a*, 1*a* and 2*a* are darkened, and $6/15^{th}$ portion of pixel 3*a* is darkened. Accordingly, in FIG. 7, the darkened area of pixel 3*a* is slightly less than the darkened areas of pixels 0*a*, . . . , 2*a*.

As illustrated in the justification table of the secondary u-cell 500 in FIG. 5*e*, pixels 0 and 3 are right justified, and pixels 1 and 2 are left justified. Accordingly, in FIG. 7, darkening of pixels 0*a* and 3*a* and are performed in a right justified manner, and darkening of pixels 1*a* and 2*a* and are performed in a left justified manner. Such justification of pixels ensures that the dot in the primary u-cell 10*a* grows in a systematic manner, and has a center that is aligned with the center of the pixels 0*a*, . . . , 3*a*.

Referring again to FIGS. 6*a*-6*w*, once all the pixels (i.e., pixels 0, . . . , 3) of the first group of pixels are darkened, starting from the requested output level of 66, pixels of the second group of pixels (i.e., pixels 4 and 5) are incrementally darkened with an increase in the requested output level, as illustrated in FIGS. 6*l*-6*p*.

Similarly, once all the pixels (i.e., pixels 4 and 5) of the second group of pixels are darkened, starting from the requested output level of 97, pixel 6 of the third group of pixels is incrementally darkened with an increase in the requested output level, as illustrated in FIGS. 6*q*-6*s*.

Similarly, once all the pixels (i.e., pixel 6) of the third group of pixels are darkened, starting from the requested output level of 113, pixel 7 of the fourth group of pixels is incrementally darkened with an increase in the requested output level, as illustrated in FIGS. 6*t*-6*w*.

For the requested output level of 127, all pixels of the secondary u-cell 500 are fully darkened, as illustrated in FIG. 6*w*.

Using 8 pixels and a PW value of 16, a total of 121 possible gray levels can be represented using a u-cell. In case the u-cell includes a larger number of pixels (e.g., 256 pixels), a relatively large (e.g., (1+(256×(16−1))), i.e., 3841) possible gray levels can be represented using a u-cell.

Stochastic Growth of Pixels

As previously discussed, although the build-up tables of FIGS. 6*a*-6*w* are associated with a secondary u-cell (i.e., secondary u-cell 500), the entries of the build-up tables of FIGS. 6*a*-6*w* are mapped to corresponding pixels of the primary u-cells. For example, the entries for various pixels in the build-up table of FIG. 6*f* are mapped to corresponding pixels of the primary u-cell 500.

Also, as previously discussed, a plurality of primary u-cells form an array of u-cells (e.g., array 300 of FIG. 3). A requested output level of a portion of the contone image corresponds to all the secondary u-cells, and accordingly, to all the primary u-cells of the array 300. That is, pixels of all the primary u-cells of the array 300 will grow in an identical manner, as the requested output level for all the u-cells in the array 300 is same.

Such identical growth of pixels across of all the primary u-cells of the array 300 may create a pattern across the image portion represented by the array 300, which may be visually detected by a human eye. Also, such identical growth of pixels restricts the maximum number of possible gray levels that can be represented by the array 300. Accordingly, it may be desirable to grow the pixels in the u-cells of the array 300 in a stochastic or pseudo-random manner, thereby avoiding identical growth of pixels across all u-cells of the array 300.

In various embodiments, a stochastic growth of the dots in an array (e.g. array 300) of u-cells are achieved by associating a pseudo-random or stochastic offset to each primary u-cell of the array, as will be discussed in more detail herein later.

Figure 8A:
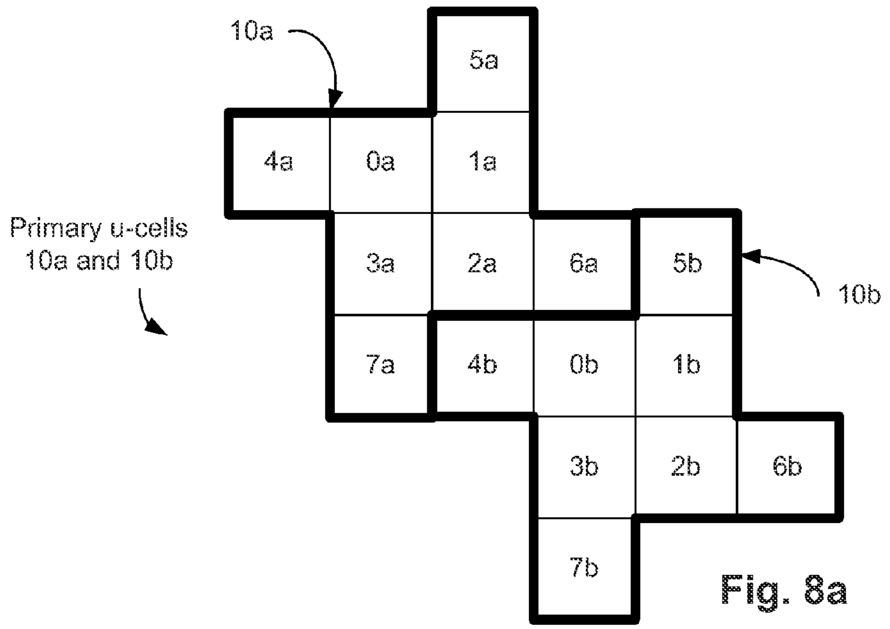
FIG. 8*a* illustrates two primary u-cells and that are included in the array of FIG. 2*b* (and also the array of FIG. 3).
Figure 8B:
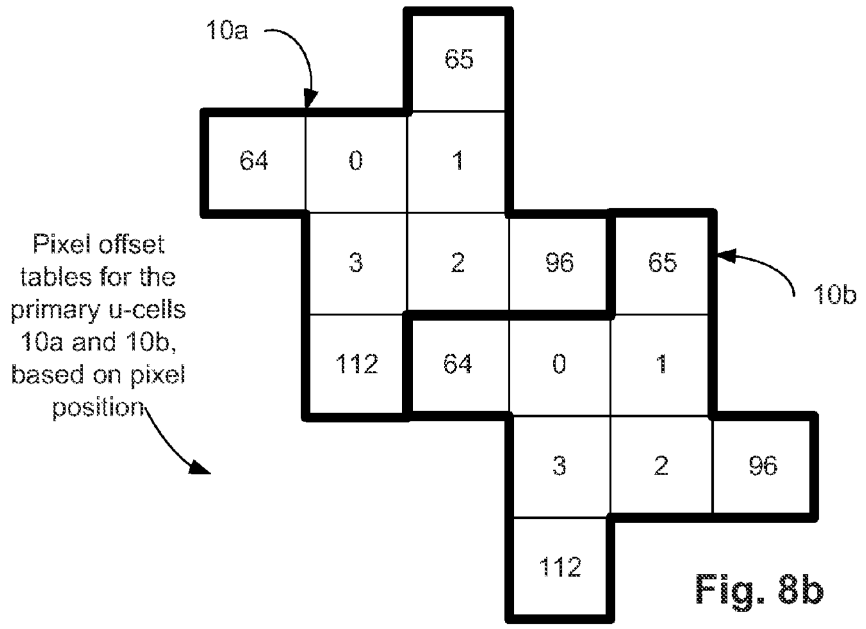
FIG. 8*b* illustrates pixel offset tables for two primary u-cells.

FIG. 8*a* illustrates two primary u-cells 10*a* and 10*b* that are included in the array 200 of FIG. 2*b* (and also array 300 of FIG. 3). As previously discussed, the primary u-cell 10*a* includes pixels 0*a*, . . . , 7*a*, and the primary u-cell 10*b* includes pixels 0*b*, . . . , 7*b*. FIG. 8*b* illustrates pixel offset tables for the primary u-cells 10*a* and 10*b*. The pixel offset tables of the primary u-cells 10*a* and 10*b* of FIG. 8*b* are constructed from the pixel offset table of the secondary u-cell 500 of FIG. 5*d*. For example, as illustrated in FIGS. 8*a* and 8*b*, pixels 0*a*, . . . , 7*a* have pixel offset factors of 0, . . . , 3, 64, 65, 96 and 112, respectively, which are similar to the pixel offset factors of respective pixels determined in FIG. 5*d*. Similarly, pixels 0*b*, . . . , 7*b* have pixel offset factors of 0, . . . , 3, 64, 65, 96 and 112, respectively.

Figure 8C:
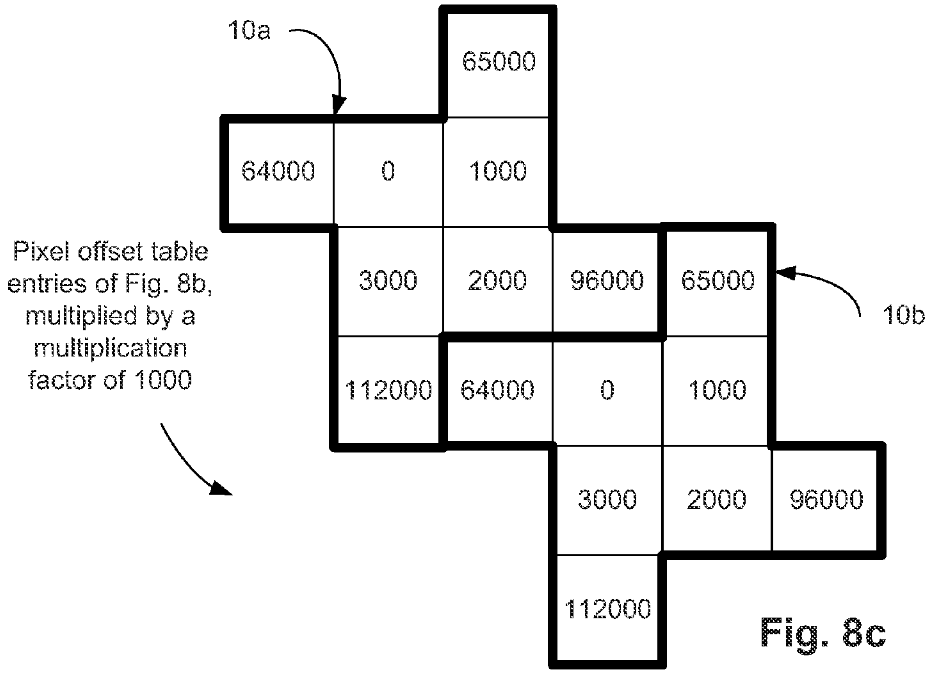
FIG. 8*c* illustrates the pixel offset table of FIG. 8*b*, with each entry being multiplied by a multiplication factor.

Each entry of the pixel offset table of FIG. 8*b* is multiplied by a multiplication factor to generate the table of FIG. 8*c*. In this example, the multiplication factor is equal to 1000. In various embodiments, the multiplication factor is based at least in part on a number of primary u-cells in the array 300. For example, the multiplication factor has to be at least equal to or greater than the number of primary u-cells included in the array 300, although in various other embodiments, the multiplication factor may be less than the number of primary u-cells included in the array 300.

The array 300 of FIG. 3 comprises 64 by 64 primary u-cells (i.e., 4096 pixels), and accordingly, in various embodiments, the multiplication factor is as large as 4096, although value of the multiplication factor may also be possible (e.g., a power of 2). However, for the sake of simplicity and as only an example, the multiplication factor is assumed to be 1000. Accordingly, corresponding to pixels 0*a*, . . . , 7*a*, the entries of the table in FIG. 8*c* are 0, 1000, 2000, 3000, 64000, 65000, 96000 and 112000, respectively. Similarly, corresponding to pixels 0*b*, . . . , 7*b*, the entries of the table in FIG. 8*c* are also 0, 1000, 2000, 3000, 64000, 65000, 96000 and 112000, respectively.

Figure 8D:
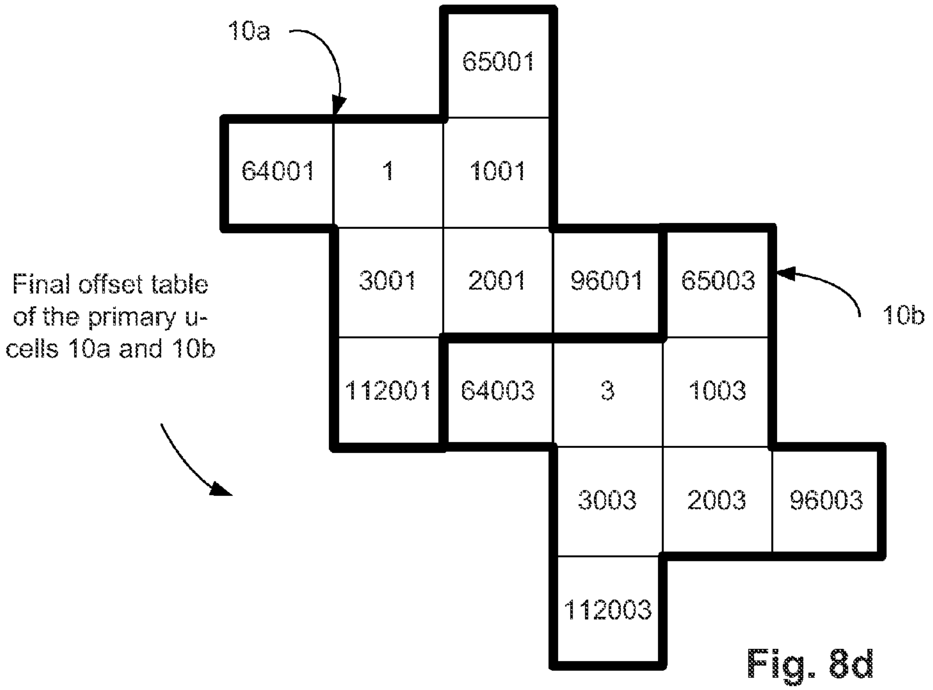
FIG. 8*d* illustrates final offset tables for two primary u-cells.

FIG. 8*d* illustrates example final offset tables for the primary u-cells 10*a* and 10*b*. For the purpose of this disclosure and unless otherwise disclosed, the entries of the final offset table of FIG. 8*d* are also referred to as final offset factors. As will be disclosed in more detail herein later, in various embodiments, the final offset factors are associated with an order in which individual pixels and individual microcells within an array are darkened while generating halftone images.

To determine the final offset tables of FIG. 8*d*, a pseudo-random or stochastic offset factor is assigned to each primary u-cell. In various embodiments, the pseudo-random or stochastic offset factor ranges from 0 to the multiplication factor, and each primary u-cell is assigned a unique pseudo-random or stochastic offset factor. For example, as discussed with respect to FIG. 3, each primary u-cell has an identification index that is associated with, for example, a relative position (e.g., x and y coordinate) of the primary u-cell in the array. In various embodiments, the pseudo-random or stochastic offset factor of a primary u-cell is associated with the respective identification index of the primary u-cell. As the pseudo-random or stochastic offset factor is unique for each primary u-cell (or is unique for a group of u-cells), and is associated with relative position of the primary u-cell in the array, the pseudo-random or stochastic offset factor is also hereinafter referred to as primary u-cell offset factor, or simply as u-cell offset factor. In various embodiments, the u-cell offset factors of various primary u-cells are stored in a stochastic u-cell offset table included in the printing controller 4. As will be disclosed in more detail herein later, in various embodiments, the u-cell offset factors are associated with an order in which individual u-cells within an array are darkened while generating halftone images.

In the example of FIG. 8*d*, the primary u-cell 10*a* is assigned a u-cell offset factor of 1, and the primary u-cell 10*b* is assigned a u-cell offset factor of 3.

The final offset tables for the primary u-cells 10*a* and 10*b* are determined by adding, for each of the pixels of individual primary u-cells, the respective u-cell factor to the entries of the tables of FIG. 8*c*. For example, for the primary u-cell 10*a*, the u-cell offset factor of 1 is added to the entries corresponding to the pixels 0*a*, . . . , 7*a*, in FIG. 8*c*. Similarly, for the primary u-cell 10*b*, the u-cell offset factor of 3 is added to the entries corresponding to the pixels 0*b*, . . . , 7*b*, in FIG. 8*c*. Accordingly, the final offset factors in the final offset table in FIG. 8*d*, corresponding to pixels 0*a*, . . . , 7*a* of the primary u-cell 10*a* are 1, 1001, 2001, 3001, 64001, 65001, 96001 and 112001, respectively. Similarly, the final offset factors in the final offset table in FIG. 8*d*, corresponding to pixels 0*b*, . . . , 7*b* of the primary u-cell 10*b* are 3, 1003, 2003, 3003, 64003, 65003, 96003 and 112003, respectively.

Although FIG. 8*d* illustrates final offset tables for primary u-cells 10*a* and 10*b* only, final offset tables corresponding to all the primary u-cells of the array 200 of FIG. 2*b* are determined in similar manner.

Thus, the pixel offset tables of FIG. 8*b* include pixel offset factors that are associated with a relative position of a pixel in a primary u-cell. This offset pattern is repeated for every primary u-cell. For example, the pixel offset factor for the top most pixel (e.g., pixel 5) in every primary u-cell is 65. That is, the pixel offset tables of individual primary u-cells are identical. However, by introducing the u-cell offset factor, the final offset tables of individual primary u-cells become unique. For example, the final offset factor corresponding to the top most pixel (e.g., pixel 5) in the primary u-cell 10*a* is 65001, whereas the final offset factor corresponding to the top most pixel in the primary u-cell 10*b* is 65003.

Determining Final Offset Tables by Appending N Bit U-cell Offset Factor

In FIGS. 8*c* and 8*d*, a multiplication factor of 1000 and u-cell offset factors are used to generate the final offset tables. In various other embodiments, the final offset tables are directly generated from the pixel offset tables, by appending N bit binary u-cell offset factors to the entries of pixel offset tables. The integer N is based at least in part on a number of primary u-cells in an array of u-cells (e.g., array 300) that represents a portion of the contone image. For example, the array 300 includes 64 by 64 primary u-cells, i.e., 4096 u-cells. Accordingly, in various embodiments, the u-cell offset factor is 12 bit in length (i.e., N=12). As previously discussed, the N bit u-cell offset factor is pseudo-random or stochastic in nature, and each primary u-cell is assigned its respective u-cell offset factor. For example, the primary u-cell 10*a* may be assigned a u-cell offset factor of 000000000001, whereas the primary u-cell 10*b* may be assigned a u-cell offset factor of 000000000011.

In various other embodiments, for the array 300, the u-cell offset factor may be less than 12 bit in length (i.e., the u-cell offset factor's range may be less than the number of primary u-cells in the array 300). In an example, N=8 for the array 300, i.e., the u-cell offset factors may have 256 possible values. Accordingly, more than one primary u-cell (e.g., four u-cells) may be assigned the same u-cell offset factors.

As previously discussed, the pixel offset tables of FIGS. 5*b* and 8*d* include pixel offset factors that range from 0 to 112. Also, as previously discussed, this range is based at least in part on the PW value and a number of pixels in the secondary u-cell. Thus, the pixel offset factors can be represented by a 7 bit binary number.

In various embodiments, the final offset factor of a pixel of a primary u-cell is determined by concatenating the corresponding pixel offset factor with the corresponding u-cell offset factor. In various embodiments, the pixel offset factor may be the least significant bits (LSB) in the final offset factor, whereas the u-cell offset factor may be the most significant bits (MSB) in the final offset factor (although in some other embodiments, the pixel offset factor may be the MSB and the u-cell offset factor may be the LSB in the final offset factor). Thus, the length of the final offset factor may be a sum of the length of the pixel offset factor and the u-cell offset factor.

As previously discussed and as illustrated in FIGS. 6*a*-6*w*, the pixel offset table of FIG. 5*d* allowed the array 300 to represent 128 possible gray levels, which is equal to the number of pixels in a primary u-cell multiplied by the PW value.

However, the addition of the u-cell offset factors ensures that each pixel in the array 300 has a unique final offset factor (or at the least, a group of pixels in the array 300 has a unique final offset factor). In various embodiments, this may allow (at least theoretically) the array 300 to represent a relatively large (e.g., larger than 128) possible gray levels. For example, there are 64 by 64, i.e., 4096 primary u-cells in the array 300, which includes 4096×8, i.e., 32768 (i.e., 2^15) numbers of unique pixels. As each pixel may have unique final offset value and as each pixel represents 16 possible gray levels (as PW value is equal to 16), the array 300 may, at least theoretically, represent 32796×16, i.e., 524,288 (i.e., 2^19) possible gray levels.

In various other embodiments, as previously discussed, more than one u-cell (e.g., four u-cells) may be assigned the same u-cell offset factors. For example, for the array 300, N may be equal to 8, i.e., the u-cell offset factors may have 256 possible values. In some of these embodiments, more than one u-cell (e.g., four u-cells) may be assigned the same u-cell offset factors. Accordingly, in some of these embodiments, more than one pixel (e.g., four pixels) may have identical final offset factors. Although possible gray levels represented by the array 300 for these embodiments is not as high as possible gray levels represented by the array 300 with unique u-cell offset factors for each u-cell, the possible gray levels represented by the array 300 for these embodiments is still much higher compared to possible gray levels represented by the array 300 without taking into account the u-cell offset factors.

The choice of the integer N is a design factor, which may be based at least in part on a desired resolution of the halftone image, complexity of the mechanism used to generate the halftone image, etc.

In various other embodiments, although not illustrated in any of the figures, each u-cell may include 256 pixels and a PW value of 16. Accordingly, the pixel offset tables will have entries that range from 0 to (256×16), i.e., 4096 or (2^12). In such a case, the entries of the pixel offset tables will be 12 bit in length. Also, in some of these embodiments, for the array 300, N is assumed to be equal to 8, i.e., the u-cell offset factors has 256 possible values. In such a case, the final offset factors are 20 bits long, of which 12 bits are associated with corresponding pixel offset factors and remaining 8 bits are associated with corresponding u-cell offset factor. In such a case, the array 300 represents 2^20 possible gray levels.

Unless otherwise mentioned and for the remaining portion of this disclosure, it is assumed that the pixel offset factors are 12 bits in length, and the u-cell offset factors are 8 bits in length, leading to final offset factors that are 20 bits long. However, such assumptions do not, in any way, limit the scope of this disclosure.

In various embodiments, similar to generating the build-up tables of FIGS. 6*a*-6*w* from the pixel offset table of FIG. 5*d*, build-up tables are also generated from the final offset tables of individual primary u-cells of the array 300. To better distinguish (i) the build-up tables (e.g., tables in FIGS. 6*a*-6*w*) that are built directly from the pixel offset table, from (ii) the build-up tables that are built from the final offset tables, unless otherwise disclosed, the build-up tables built from the final offset tables are also herein referred to as final build-up tables. Also, entries of the build-up tables are referred herein as final build-up factors. As the final build-up tables are generated in a manner similar to the generation of the build-up tables of FIGS. 6*a*-6*w* (although the former are generated from final offset tables, while the latter are generated from the pixel offset tables), a detailed description of the generation of the final build-up tables are omitted herein.

As previously discussed, the build-up tables of FIGS. 6*a*-6*w* are applicable to all the u-cells of the array 300 (as the offset table of FIG. 5*d* is identical for all the u-cells of the array 300). However, most primary u-cells (e.g., every four primary u-cells) of the array 300 have a unique final offset table. Accordingly, most primary u-cells (e.g., every four primary u-cells) of the array 300 also have unique final build-up tables.

Input Look Up Table (InLUT)

The build-up tables of FIGS. 6*a*-6*w* are generated by comparing a requested output level with the pixel offset factors of FIG. 5*d*, where the requested output level ranges from 0 to 128. That is, for FIGS. 6*a*-6*w*, the requested output level ranges from 0 to the maximum possible gray level that can be represented by the u-cell, without taking into account the u-cell offset factor. However, as previously discussed, after taking into account the u-cell offset factor, the array 300 may, at least theoretically, represent 2^20 possible gray levels. Accordingly, to generate the final build-up tables, the requested output level has to range from 0 to (2^20−1). Although there are 2^20 possible gray levels, some of the gray levels may be counted more than once, and as previously discussed, the actual number of unique gray levels represented by the array 300 may be less than 2^20. In various embodiments, instead of using all the possible unique gray levels represented by the array 300, only a smaller subset (e.g., comprising 256 or 512 gray levels) may be used to generate the halftone image (e.g., the smaller subset may be chosen from all possible values of the unique gray levels based on a desired printing output levels).

In various embodiments, the contone image received by the printing device 1 has, for example, 256 possible gray levels (although the contone image may have other number of possible gray levels, e.g., 128, or 512 or any other appropriate number of possible gray levels). Thus, in these embodiments, the default requested output level of the contone image ranges from 0 to 255. That is, the default requested output level of the contone image is an 8 bit binary number. However, as the requested output level for the final build-up tables has to range from 0 to (2^20−1), the default requested output level of the contone image is normalized to this level.

In various embodiments, the printing controller 4 of FIG. 1 generates and/or stores an input look up table (InLUT) that maps the 8 bit default requested output level (i.e., 8 bit input data) of the contone image to a higher bit number (e.g., a 20 bit number, which may be equal to a length of the final offset factors). Thus, an input to the InLUT is the 8 bit default requested output level, whereas an output of the InLUT is the 20 bit normalized requested output level used to generate the final build-up tables. To add stochastic or random pattern in the array 200, the InLUT maps the 8 bit default requested output level of the contone image to the 20 bit normalized requested output level, by assigning the u-cell offset factors to various u-cells in a specific and/or pseudo-random manner.

In various embodiments, the InLUT output values between 0 and (2^20−1) represent a total range of possible grayscale values available for the halftone image. In various embodiments, the gray level of the halftone image increases monotonically with the output values (i.e., the normalized requested output level that ranges from 0 to (2^20−1)) of the InLUT. That is, the higher the normalized requested output level, the darker the image represented by the halftone image. Thus, any relatively higher numbered entry of the InLUT is associated with a gray level that is not relatively lighter compared to a gray level associated with any relatively lower number entry of the InLUT. In various embodiments, the selection of optimal levels to include in the InLUT is done by measuring output print samples of many different levels. In various embodiments, instead of using all the possible unique gray levels represented by the array 300 while generating and printing the halftone image, only a smaller subset (e.g., comprising 256 or 512 gray levels) may be used to generate the halftone image (e.g., the smaller subset may be chosen from all possible values of the unique gray levels based on a desired printing output levels).

Determining U-Cell Boundary Crossing

Figures 9A, 9B:
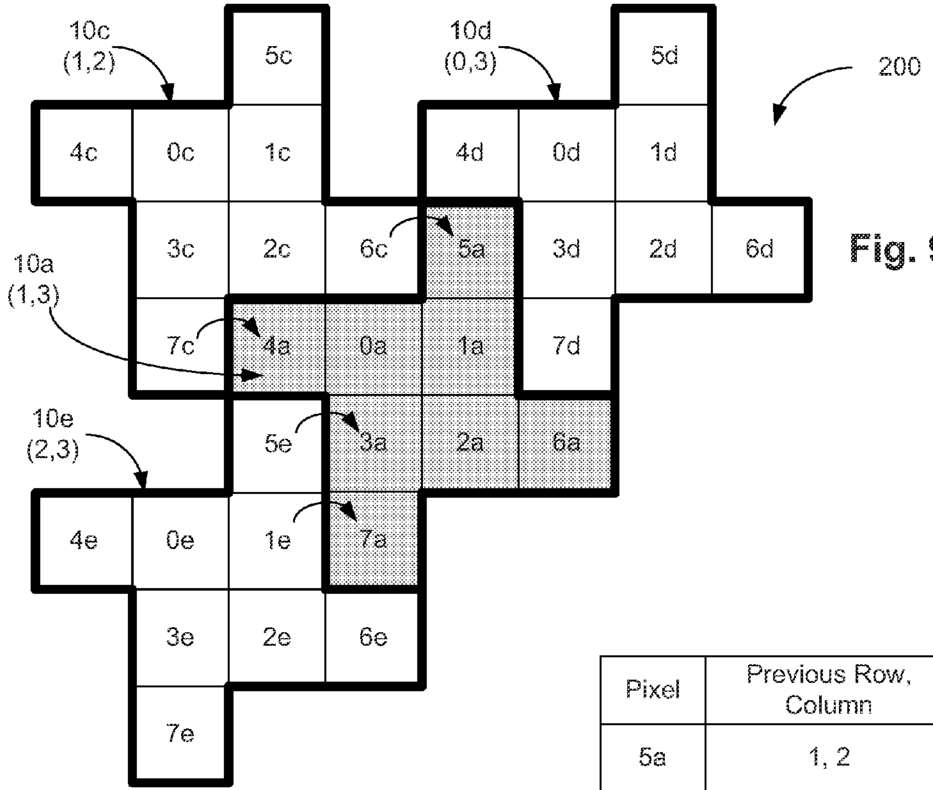
FIG. 9*a* illustrates a primary u-cell, and various neighboring primary u-cells, along with horizontal boundary crossings for the primary u-cell.
FIG. 9*b* illustrates horizontal u-cell boundary crossing from left to right, while processing individual pixels of the primary u-cell of FIG. 9*a*.

FIG. 9*a* illustrates primary u-cell 10*a*, and neighboring primary u-cells 10*c*, 10*d* and 10*e*, along with horizontal boundary crossings for u-cell 10*a*. The primary u-cells 10*a*, 10*c*, 10*d* and 10*e* are from the arrays 200 and 300 of FIGS. 2*b* and 3, respectively. In FIG. 9*a*, the primary u-cell 10*a* is shaded to distinguish the primary u-cell 10*a* from other illustrated primary u-cells. Identification indices of the primary u-cells 10*a*, 10*c*, 10*d* and 10*e* (e.g., the x and y coordinates of the primary u-cells) are also illustrated in FIG. 9*a*. For example, the (x,y) coordinates of primary u-cells 10*a*, 10*c*, 10*d* and 10*e* are (1,3), (1,2), (0,3), and (2,3), as discussed with respect to FIG. 3.

While generating the halftone image, the printing controller 4 processes pixels from left to right. For example, while processing the third pixel line illustrated in FIG. 9*a*, the printing controller 4 processes pixels 3*c*, 2*c*, 6*c*, 5*a*, 3*d*, 2*d*, 6*d*, and so on, in that order. As illustrated in FIG. 9*a*, horizontal boundary crossing (illustrated using arrows) for primary u-cell 10*a* is for pixels 5*a*, 4*a*, 3*a* and 7*a* only. In various embodiments, while generating the halftone image, the printing controller 4 processes pixels of more than one pixel line (e.g., a strip of pixel lines) from left to right. For example, while generating the halftone image, the printing controller 4 processes pixels of horizontal pixel lines 1, 2 and 3 of FIG. 9*a* from left to right FIG. 9*b* illustrates horizontal u-cell boundary crossing from left to right, while processing individual pixels of the primary u-cell 9*a*. For example, for the pixel 5*a* of primary u-cell 10*a*, the immediate previous pixel that was processed belonged to a primary u-cell (i.e., primary u-cell 10*c*) having a (x,y) coordinate of (1,2) (i.e., the primary u-cell of the immediate previous pixel processed had a row number of 1 and a column number of 2). As the pixel 5*a* is included in the primary u-cell 10*a* with (x,y) coordinate of (1,3), processing of pixel 5*a* results in change of a row number of 0 and the change of a column number of +1.

Similarly, processing of pixel 4*a* results in change of a row number of 0 and the change of a column number of +1, processing of pixel 3*a* results in change of a row number of −1 and the change of a column number of 0, and processing of pixel 7*a* results in change of a row number of −1 and the change of a column number of 0, as illustrated in FIG. 9*b*.

As all primary u-cells are traversed identically, horizontal boundary crossing information of other u-cells are identical (e.g., identical changes in rows and columns for corresponding pixels) to those in FIG. 9*b*.

Figures 10A, 10B:
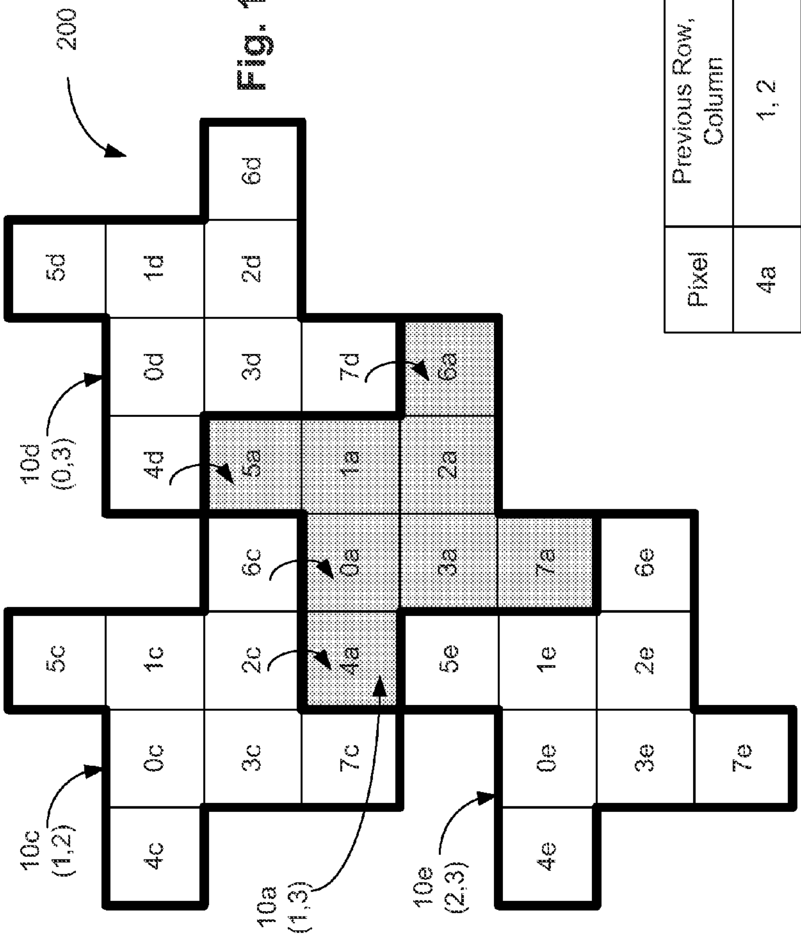
FIG. 10*a* illustrates a primary u-cell, and various neighboring primary u-cells, along with vertical boundary crossings for the primary u-cell.
FIG. 10*b* illustrates vertical u-cell boundary crossing from a line to an immediate next line in the bottom, while processing individual pixels of the primary u-cell of FIG. 10*a*.

FIG. 10*a* illustrates primary u-cell 10*a*, and neighboring primary u-cells 10*c*, 10*d* and 10*e*, along with vertical boundary crossings for u-cell 10*a*. The x and y coordinates of the primary u-cells 10*a*, 10*c*, 10*d* and 10*e* are also illustrated in FIG. 10*a*.

While generating the halftone image, the printing controller 4 also processes pixels from one line to the line below. As illustrated in FIG. 10*a* (illustrated using arrows), vertical boundary crossing for primary u-cell 10*a* is for pixels 4*a*, 0*a*, 5*a* and 6*a* only. In various embodiments, while generating the halftone image, the printing controller 4 processes pixels of more than one pixel line (e.g., a strip of pixel lines) from top to bottom. For example, while generating the halftone image, the printing controller 4 processes pixels of vertical pixel lines 1, 2 and 3 of FIG. 10*a* from top to bottom.

FIG. 10*b* illustrates vertical u-cell boundary crossing from a line to an immediate next line in the bottom, while processing individual pixels of the primary u-cell 10*a*. For example, for the pixel 4*a* of primary u-cell 10*a*, the immediate previous pixel that was processed in the immediate top line belonged to a primary u-cell (e.g., primary u-cell 10*c*) having a (x,y) coordinate of (1,2). Thus, processing of pixel 4*a* results in change of a row number of 0 and the change of a column number of +1.

Similarly, processing of pixel 0*a* results in change of a row number of 0 and the change of a column number of +1, processing of pixel 5*a* results in change of a row number of +1 and the change of a column number of 0, and processing of pixel 6*a* results in change of a row number of +1 and the change of a column number of 0, as illustrated in FIG. 10*b*.

As all primary u-cells are traversed identically, vertical boundary crossing information of other u-cells will be identical (e.g., identical change in rows and columns for corresponding pixels) to those in FIG. 10*b*.

In various embodiments, the horizontal and vertical boundary crossing information of FIGS. 9*b* and 10*b* are used to keep track of primary u-cell identification index associated with individual primary u-cells of the array 300, thereby allowing correct assignment of u-cell offset factors to individual pixels of the array 300. Such assignment of u-cell offset factor to individual pixels may be used while generating the previously discussed final offset tables and/or the InLUT.

Stochastically Start and Fill in U-Cells

In various embodiments, the previously discussed final build-up tables allow generating and printing of pixels in an increment of the PW value. For example, if the PW value is 16, then pixels can be generated and printed in the increment of $\frac{1}{15}^{th}$ of a pixel (e.g., 0% of the pixel being printed, $\frac{1}{15}^{th}$ of the pixel being printed, $\frac{2}{15}^{th}$ of the pixel being printed, . . . , the full pixel being printed). This implementation is able to generate a dot from a pixel, where the dot possibly ranges from a smallest dot a pixel can represent (i.e., $\frac{1}{15}^{th}$ of a pixel), to a largest dot a pixel can represent (i.e., the whole pixel).

Many printing devices (e.g., laser printers) produce dots in a non-linear way, and cannot place isolated portions of a pixel or leave tiny portions of a pixel blank when surrounded by full-on pixels in a controllable way. Thus, such printing devices may be not able to place an isolated dot (i.e., the dot not being connected to one or more adjacently placed dots) that represents, for example, $\frac{1}{15}^{th}$ of a pixel. Such limitations of the printing devices leaves a number of previously generated final build-up tables unusable at a light end and a dark end of the normalized requested output level.

For example, as previously discussed, the output of the InLUT (i.e., the normalized requested output level) ranges from 0 to (2^20−1). Relatively small values (e.g., ranging from 0 to 1000) of the normalized requested output level corresponds to a very light gray level. At such low values of the normalized requested output levels, very few isolated pixels will be turned on, and the very few isolated pixels that are turned on will have, for example, only $\frac{1}{15}^{th}$ portion of the pixels turned on. Similarly, relatively large values (e.g., ranging from 2^−19 to (2^20−1)) of the normalized requested output level corresponds to a very dark gray level. At such high values of the normalized requested output levels, very few isolated pixels will remain turned off (i.e., very few isolated holes will exists in otherwise total dark array), and the very few isolated holes will correspond to, for example, only $\frac{1}{15}^{th}$ portion of isolated pixels being turned off.

For many printing devices, for example, printing $\frac{1}{15}^{th}$ portion (or even $\frac{2}{15}^{th}$ or $\frac{3}{15}^{th}$ portion) of isolated pixels, or printing $\frac{1}{15}^{th}$ portion (or even $\frac{2}{15}^{th}$ or $\frac{3}{15}^{th}$ portion) of isolated holes may not produce satisfactory print quality. Accordingly, in various embodiments, it may be desirable that darkening of individual isolated pixels in individual u-cells start from a minimum threshold level. In various embodiments, it may be desirable that darkening of individual isolated pixels in individual u-cells start at least from, for example, $\frac{10}{15}^{th}$ of a pixel. For example, for an InLUT output (i.e., the normalized requested output level) of 0, all pixels in all the u-cells are turned off. For an InLUT output of 1, for example, only a fraction of a $1^{st}$ pixel (e.g., $\frac{1}{15}^{th}$ of the $1^{st}$ pixel) in only one u-cell (e.g., a $1^{st}$ u-cell) is supposed to be turned on. However, instead of turning on just $\frac{1}{15}^{th}$ of the $1^{st}$ pixel in the $1^{st}$ u-cell, at least $\frac{10}{15}^{th}$ of the $1^{st}$ pixel in the $1^{st}$ u-cell is turned on. Similarly, for an InLUT output of 2, only $\frac{1}{15}^{th}$ of the $1^{st}$ pixel in the $1^{st}$ u-cell and only $\frac{1}{15}^{th}$ of a $2^{nd}$ pixel in a $2^{nd}$ u-cell is supposed to be turned on. However, instead of turning on just $\frac{1}{15}^{th}$ of the $1^{st}$ and $2^{nd}$ pixels, at least $\frac{10}{15}^{th}$ of the $1^{st}$ pixel and $\frac{10}{15}^{th}$ of the $2^{nd}$ pixel in the $1^{st}$ and $2^{nd}$ u-cells, respectively, are turned on. Such comparison and replacement of the pixel values causes the printing device 1 to only generate and print dots that can be satisfactorily printed by the printing mechanism 6.

Similarly, in various embodiments, it may also be desirable that a size of a hole in individual u-cells is at least as large as, for example, $\frac{10}{15}^{th}$ of a pixel.

In various embodiments, the printing controller 4 of the printing device 1 of FIG. 1 generates, or is otherwise supplied with a high threshold value (hereinafter also referred to as ThreshHi) and a low threshold value (hereinafter also referred to as ThreshLo). The ThreshLo is associated with a minimum value of the normalized requested output level for which the pixel growth is stable, without compromising the print quality. Similarly, the ThreshHi is associated with a maximum value of the normalized requested output level for which the holes are stable, without compromising the print quality. The ThreshHi and ThreshLo values are determined based at least in apart on, for example, resolution of the printing mechanism 6 of the printing device 1 of FIG. 1.

In various embodiments, the printing controller 4 compares the normalized requested output level (which is output by the InLUT) with the ThreshHi and ThreshLo values, and generates a final requested output level.

As previously discussed, individual entries of the InLUT (i.e., individual normalized requested output levels) includes pixel offset factors appended with corresponding u-cell offset factors. If a first normalized requested output level is less than the ThreshLo, a first subset of u-cells is selected such that a fraction (e.g., $1/15^{th}$, $2/15^{th}$, $9/15^{th}$) of at least one or more pixels in individual u-cells of the first subset of u-cells are supposed to be turned on for the first normalized requested output level. Subsequently, individual u-cells in the selected first subset of u-cells are partially turned on to least at a threshold level (e.g., at least $10/15^{th}$ of a pixel in each u-cell in the first subset is turned on). That is, if the first normalized requested output level is less than the ThreshLo, the first subset of u-cells are selected such that for the selected u-cells, at least one or more corresponding pixel offset factors are non-zero. Subsequently, the pixel offset factors of the u-cells in the first subset are replaced by a threshold such that at least a threshold fraction of each u-cell in the first subset is turned on. For example, for each u-cell in the selected first subset of u-cells, at least $10/15^{th}$ of a pixel is turned. However, if the first normalized requested output level is equal to 0 (which is equivalent to all pixels being fully turned off), the normalized requested output level is not replaced by ThreshLo.

Similarly, if a second normalized requested output level is greater than the ThreshHi, a second subset of u-cells is selected such that a fraction (e.g., $1/15^{th}$, $2/15^{th}$ $9/15^{th}$) of one or more pixels in individual u-cells of the second subset of u-cells are supposed to be turned off for the second normalized requested output level (and the remaining pixels to be turned on). To avoid creation of relatively small and isolated holes in the generated image, individual u-cells in the selected second subset of u-cells fully are turned on. That is, if the second normalized requested output level is more than the ThreshHi, the second subset of u-cells are selected such that for the selected u-cells, one or more corresponding pixel offset factors are greater than a threshold value (i.e., holes corresponding to these pixels are relatively small and isolated). Subsequently, these pixel offset factors are replaced by a maximum threshold (e.g., fully on) such that all pixels of the u-cells in the second subset are fully turned on. Thus, the normalized requested output levels for individual pixels in the selected second subset of u-cells are replaced by the ThreshLo (which is equivalent to all pixels in the second subset of u-cells being fully turned on). This ensures prevention of isolated holes, which are smaller than the resolution of the printing device 1, in the u-cells.

In various embodiments, based on such comparison and replacement, a final normalized requested output level is generated. The final normalized requested output level (e.g., instead of the normalized requested output level) is then used to generate the previously discussed final build-up tables. Such modification to the normalized requested output level causes the printing device 1 to only generate and print dots or holes that can be satisfactorily printed by the printing mechanism 6.

Printing Controller

Figure 11:
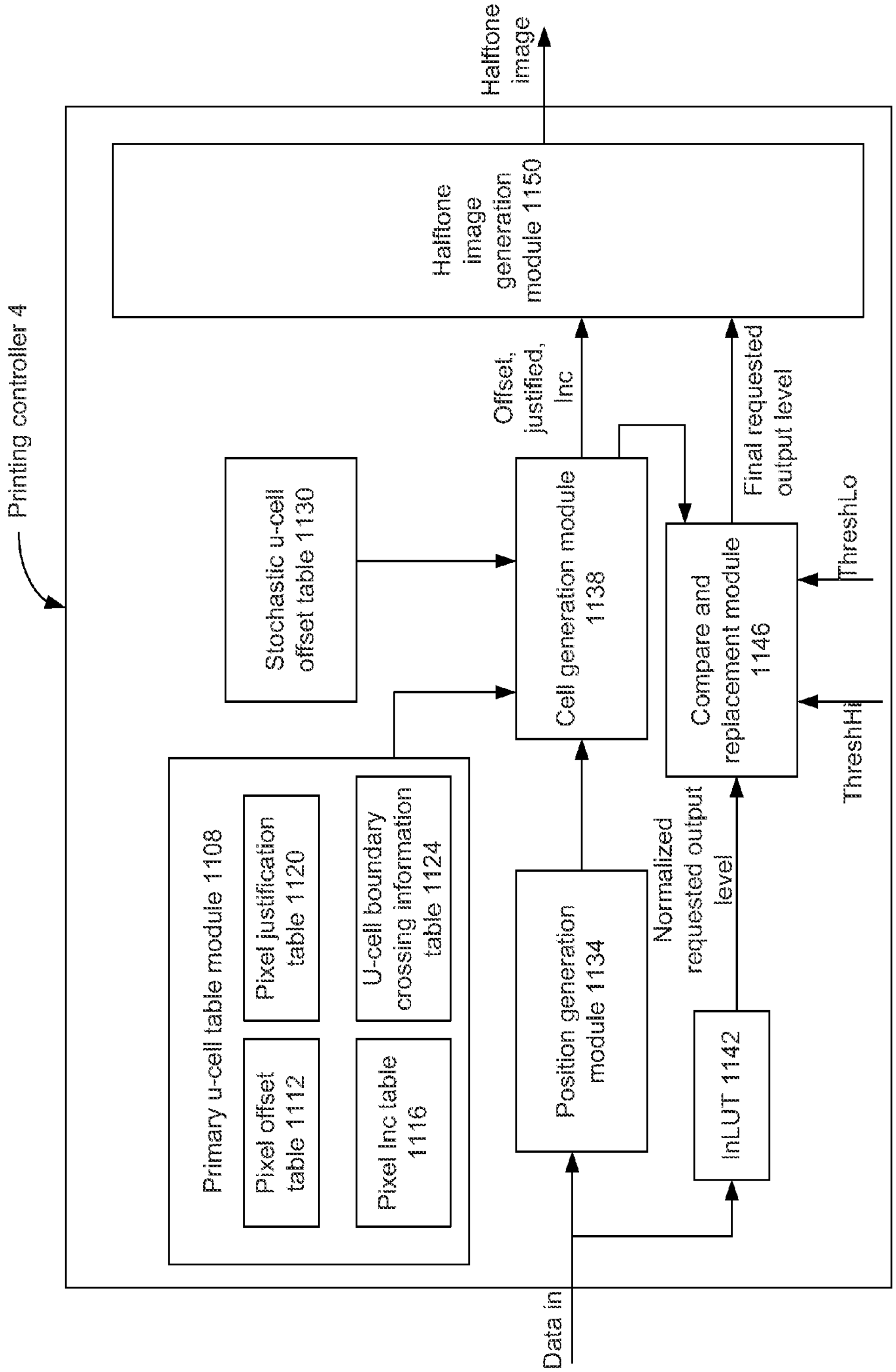
FIG. 11 schematically illustrates a printing controller of the printing device of FIG. 1.

FIG. 11 schematically illustrates the printing controller 4 of the printing device 1 of FIG. 1. As previously discussed, the printing controller 4 is configured to receive a contone image (illustrated as "data in" in FIG. 11), and to generate a halftone image corresponding to the contone image.

The printing controller 4 includes a primary u-cell table module 1108 comprising a pixel offset table 1112, a pixel justification table 1120, a pixel Inc table 1116, and a u-cell boundary crossing information table 1124. The pixel offset table 1112 stores pixel offset factors for various pixels of a microcell, as discussed with respect to FIGS. 5*d* and 8*b*. The pixel justification table 1120 stores justification tables for various pixels of a microcell, as discussed with respect to FIG. 5*e*. The pixel Inc table 1116 stores Inc values for various pixels of a microcell, as discussed with respect to FIG. 5*d*. The u-cell boundary crossing information table 1124 stores horizontal and vertical u-cell boundary crossing information, as discussed with respect to FIGS. 9*a*, 9*b*, 10*a* and 10*b*.

The printing controller 4 also includes a stochastic u-cell offset table 1130 configured to store, corresponding to each microcell of the plurality of microcells, a microcell offset factor, as discussed with respect to FIGS. 8*b*-8*d*.

The printing controller 4 also includes a position generation module 1134 which is configured to track a position of a pixel in the u-cell and accordingly, to access a relevant entry in the primary u-cell table module 1108 to extract the table values of 1112, 1120, 1116 and 1124.

The printing controller 4 further includes a cell generation module 1138 which is configured to receive, for each pixel of the plurality of pixels of array 300, (i) the respective pixel offset factor from the primary u-cell table module 1108, and (ii) the respective microcell offset factor from the stochastic u-cell offset table 1130. The cell generation module 1138 is further configured to generate a final offset factor for each pixel of the plurality of pixels in each microcell, and output the final offset factors to a halftone image generation module 1150. The cell generation module 1138 is also configured to receive justification value and Inc value of individual pixels of a microcell from the pixel justification table 1120 and the pixel Inc table 1116, respectively, and output the justification values and Inc values of the individual pixels to the halftone image generation module 1150.

The printing controller 4 further includes an InLUT 1142. As previously discussed, the InLUT 1142 is configured to receive a requested output level of the contone image (e.g., included in or determined form the data in), and to map the received requested output level to a normalized requested output level. A compare and replacement module 1146 of the printing controller 4 is configured to receive the normalized requested output level, a ThreshHi value, a ThreshLo value, and the final offset value from the cell generation module 1138. As previously discussed, the compare and replacement module 1146 is configured to compare the normalized requested output level (which is output by the InLUT 1142) with the ThreshHi and ThreshLo values, and to generate a final requested output level to selectively turn on at least a threshold fraction of u-cells in the first subset of u-cells based in part on the final offset values. Although not illustrated in FIG. 11, in various embodiments, the compare and replacement module 1146 may be included in the halftone image generation module 1150.

The printing controller 4 also includes the halftone image generation module 1150 that is configured to receive the final offset factors, justification values and Inc values of individual pixels, and the final requested output level. Based at least in part on these inputs, the halftone image generation module 1150 is configured to generate final build-up tables for various primary u-cells of the array 300, as previously discussed. Based at least in part on the generated final build-up tables, the halftone image generation module 1150 is configured to generate the halftone image corresponding to the contone image.

In an embodiment, the printing device 1 does not save the final build-up tables directly. In various embodiments, generation of the final build-up tables, based at least in part on the received requested output level, is done on-the-fly by the printing controller 4. Accordingly, the printing device 1 need not save such final build-up tables, thereby requiring relatively less memory space in the printing device 1. In contrast, conventional printing devices usually stores threshold tables for all the pixels in the memory, thereby requiring relatively large memory. Additionally, as disclosed in this disclosure, introducing the u-cell offset factor increases the possible gray levels of the halftone images by many folds, thereby increasing a resolution of the generated halftone image.

Methods for Operating the Printing Device 1

Figure 12:
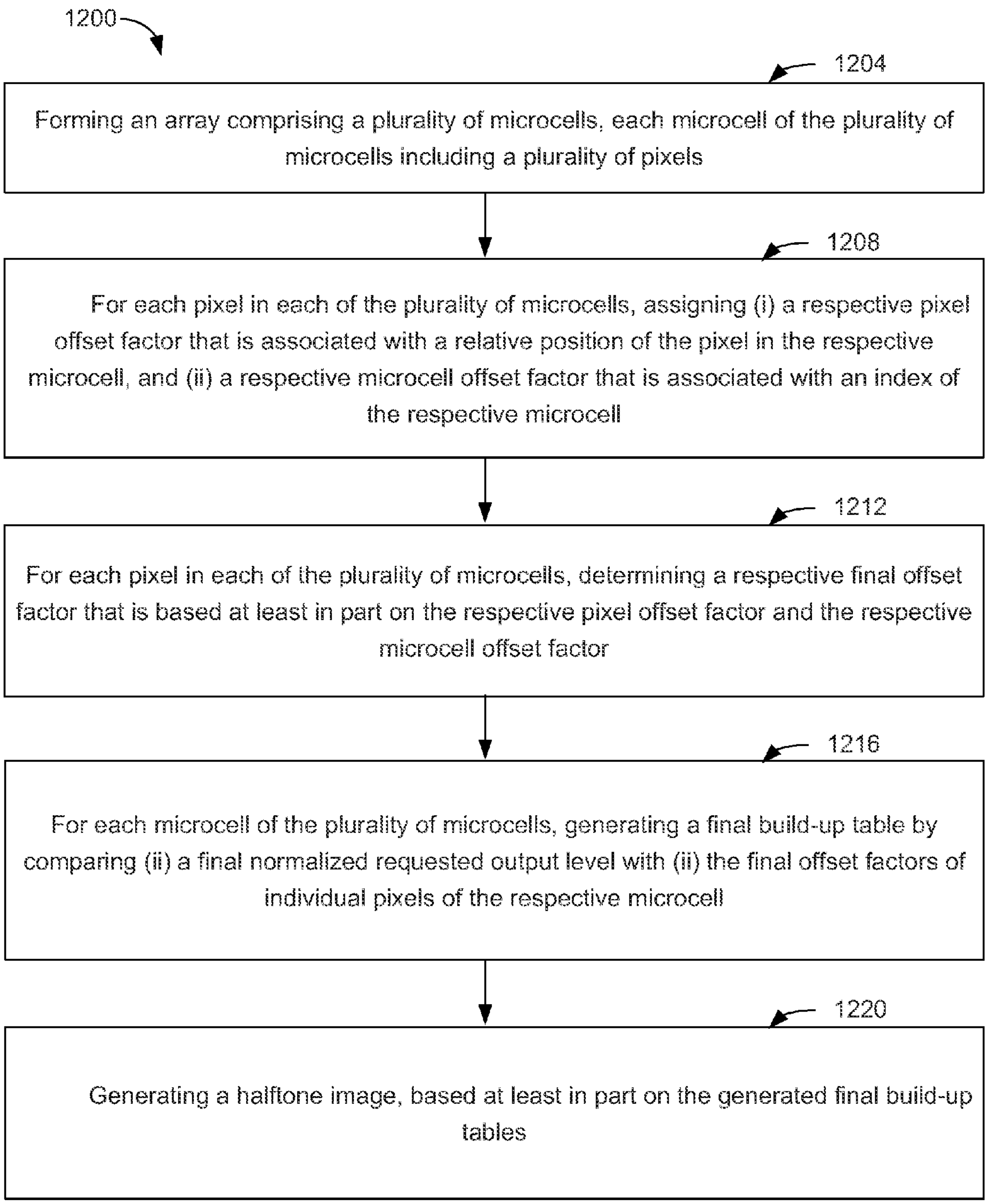
FIG. 12 illustrates an example method for operating the printing device of FIG. 1.

FIG. 12 illustrates an example method 1200 for operating the printing device of FIG. 1. The method 1200 includes, at 1204, forming (e.g., by the printing controller 4) an array (e.g., array 300 of FIG. 3) comprising a plurality of microcells (e.g., u-cells 10*a*, . . . , 10*j* of FIGS. 2 and 3), each microcell of the plurality of microcells including a plurality of pixels (e.g., pixels 0*a*, . . . , 7*a* of u-cell 10*a*).

At 1208, the method further includes, for each pixel in each of the plurality of microcells, assigning (i) a respective pixel offset factor that is associated with a relative position of the pixel in the respective microcell (e.g., as discussed with respect to FIGS. 5*d* and 8*b*), and (ii) a respective microcell offset factor that is associated with an index of the respective microcell (e.g., as discussed with respect to FIGS. 8*b*-8*d*). In an example, the pixel offset factor is assigned by and/or stored in the pixel offset table 1112 of FIG. 11, and the microcell offset factor is assigned by and/or stored in the stochastic u-cell offset table 1130 of FIG. 11.

At 1212, the method further includes, for each pixel in each of the plurality of microcells, determining a respective final offset factor (e.g., by the cell generation module 1138 of FIG. 11) that is based at least in part on the respective pixel offset factor and the respective microcell offset factor. For example, for each pixel in each of the plurality of microcells, the final offset factor is a concatenation of the respective pixel offset factor and the respective microcell offset factor. In each of the final offset factors, the respective microcell offset factor forms most significant bits (MSB) and the respective pixel offset factor forms least significant bits (LSB).

At 1216, the method further includes, for each microcell of the plurality of microcells, generating a final build-up table by comparing (ii) a final normalized requested output level with (ii) the final offset factors of individual pixels of the respective microcell. For example, the InLUT 1142 receives or otherwise generates a requested output level that is representative of a color level (e.g., gray scale level) of a portion of a contone image. The InLUT 1142 maps the received requested output level to a normalized requested output level, wherein a range of the normalized requested output level is equal to a range of the final offset factor. Furthermore, the compare and replacement module 1146 determines the final normalized requested output level based at least in part on a comparison of the normalized requested output level with the high threshold value ThreshHi and the low threshold value ThreshHi.

At 1220, the method further includes, generating a halftone image, based at least in part on the generated final build-up tables. For example, while generating the halftone image, individual pixels may be darkened based at least in part on the entries of the final build-up tables.

Although specific embodiments have been illustrated and described herein, a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. This application is intended to cover any adaptations or variations of the embodiments discussed herein.

What is claimed is:

1. A method comprising:

forming an array comprising a plurality of microcells, each microcell of the plurality of microcells including a plurality of pixels;

for each pixel in each of the plurality of microcells, assigning (i) a respective pixel offset factor that is associated with a relative position of the pixel in the respective microcell, wherein the pixel offset factors are associated with an order in which individual pixels within a microcell are darkened while generating halftone images, and (ii) a respective microcell offset factor that is associated with an index of the respective microcell, wherein the microcell offset factors are associated with an order in which individual microcells within the array are darkened while generating halftone images; and for each pixel in each of the plurality of microcells, determining a respective final offset factor that is based at least in part on the respective pixel offset factor and the respective microcell offset factor, wherein the final offset factors are associated with an order in which individual pixels and individual microcells within the array are darkened while generating halftone images.

2. The method of claim 1, wherein for each pixel in each of the plurality of microcells, the respective final offset factor is a concatenation of the respective pixel offset factor and the respective microcell offset factor.

3. The method of claim 1, wherein in each of the final offset factors, the respective microcell offset factor forms most significant bits (MSB) and the respective pixel offset factor forms least significant bits (LSB).

4. The method of claim 1, wherein the microcells included in the plurality of microcells are primary microcells, the method further comprising:

redefining microcell boundaries in the array to generate a plurality of secondary microcells, each secondary microcell of the plurality of secondary microcells including a plurality of pixels; and for each secondary microcell of the plurality of secondary microcells, grouping pixels included in the secondary microcell in a plurality of groups, such that each of the plurality of groups includes one or more pixels.

5. The method of claim 4, wherein the plurality of secondary microcells includes a first secondary microcell, wherein the first secondary microcell includes a first plurality of groups that includes at least a first group and a second group;

wherein the first group comprises at least N1 number of pixels that includes a first pixel and a second pixel, wherein the first pixel is a lowest numbered pixel and the second pixel is a second lowest numbered pixel among the at least N1 number of pixels included in the first group, wherein N1 is an integer;

wherein the second group comprises at least a third pixel and a fourth pixel, wherein the third pixel is a lowest numbered pixel and the fourth pixel is a second lowest numbered pixel among the pixels included in the second group;

wherein pixels in the first group of the first plurality of groups are grown first while growing pixels of the first secondary microcell, followed by pixels in the second group; and wherein said assigning the respective pixel offset factor further comprises assigning the array a pulse width (PW) value that is associated with a resolution of a halftone image associated with the array, assigning a pixel offset factor of 0 to the first pixel and a pixel offset factor of 1 to the second pixel, and assigning a pixel offset factor of K1 to the third pixel and a pixel offset factor of (K1+1) to the second pixel, wherein K1 is an integer that is equal to a product of (i) (N1−1), and (ii) the PW value.

6. The method of claim 1, wherein said assigning the respective microcell offset factor further comprises:

for each microcell of the plurality of microcells, assigning, in a pseudo-random manner, the respective microcell offset factor that is associated with the index of the respective microcell.

7. The method of claim 1, further comprising:

receiving a requested output level that is representative of a color level of a portion of a continuous tone image; and mapping, using an input lookup table, the received requested output level to a normalized requested output level, wherein a range of the normalized requested output level is equal to a range of the final offset factor.

8. The method of claim 7, further comprising:

determining a final normalized requested output level based at least in part on a comparison of the normalized requested output level with a high threshold value and a low threshold value.

9. The method of claim 8, further comprising:

for each microcell of the plurality of microcells, generating a final build-up table based at least in part on a comparison of (i) the final normalized requested output level, and (ii) the final offset factors of individual pixels of the respective microcell.

10. The method of claim 8, wherein:

the plurality of microcells included in the array are primary microcells;

the method further comprises redefining microcell boundaries of individual primary microcells of the plurality of microcells to generate a plurality of secondary microcells, each secondary microcell of the plurality of secondary microcells including a plurality of pixels, wherein the plurality of secondary microcells includes a first secondary microcell;

grouping pixels included in the first secondary microcell in a first plurality of groups that includes at least a first group, wherein the first group comprises at least a first pixel;

determining a first difference value by comparing the final normalized requested output level with the final offset factor of the first pixel;

if the first difference value is negative or zero, assigning a final build-up factor of zero to the first pixel; and if the first difference value is positive (i) determining a normalized first difference value by normalizing the first difference value by a number of pixels included in the first group, (ii) if the normalized first difference value is an integer, assigning to the first pixel a final build-up factor that is equal to the normalized first difference value, and (iii) if the normalized first difference value is a fraction, assigning to the first pixel a final build-up factor that is equal to a largest integer that is smaller than the fraction.

11. The method of claim 10, further comprising:

while generating a halftone image, darkening the first pixel based at least in part on the final build-up factor of the first pixel.

12. A method comprising:

forming an array comprising a plurality of microcells, each microcell of the plurality of microcells including a plurality of pixels;

for each pixel in each of the plurality of microcells, determining a respective final offset factor, thereby generating a plurality of final offset factors corresponding to the plurality of pixels, wherein the respective final offset factor is associated with an order in which the individual pixels and the individual microcells are darkened while generating halftones;

receiving a requested output level that is representative of a color level of a portion of a continuous tone image; and mapping, using an input lookup table (InLUT), the received requested output level to a normalized requested output level, wherein a range of the normalized requested output level is equal to a range of the plurality of final offset factors.

13. The method of claim 12, further comprising:

determining a final normalized requested output level based at least in part on a comparison of the normalized requested output level with a high threshold value and a low threshold value.

14. The method of claim 12, wherein for each pixel in each of the plurality of microcells, the respective final offset factor is a concatenation of a respective pixel offset factor and a microcell offset factor, the method further comprising:

for each pixel in each of the plurality of microcells, assigning (i) the respective pixel offset factor that is associated with a relative position of the pixel in the respective microcell, and (ii) the respective microcell offset factor that is associated with an index of the respective microcell.

15. The method of claim 14, further comprising:

generating the InLUT such that individual entries of the InLut is a concatenation of a respective pixel offset factor and a microcell offset factor.

16. The method of claim 14, wherein the entries of the InLUT are monotonic, such that any relatively higher numbered entry of the InLUT is associated with a gray level of a halftone image that is not relatively lighter compared to a gray level associated with any relatively lower number entry of the InLUT.

17. A printing device comprising:

a printing mechanism; and a printing controller configured to (i) receive a continuous tone image, and (ii) generate a halftone image that is to be printed by the printing mechanism, wherein the halftone image comprises a plurality of arrays, each of the plurality of arrays comprises a plurality of microcells, each of the plurality of microcells comprises a plurality of pixels, the printing controller comprising a microcell table module configured to store a pixel offset table that includes a pixel offset factor associated with each pixel of a microcell, a stochastic table module configured to store, corresponding to each microcell of the plurality of microcells, a microcell offset factor, and a cell generation module configured to receive, for each pixel of the plurality of pixels, (i) the respective pixel offset factor from the microcell table module, and (ii) the respective microcell offset factor from the stochastic table module, wherein the cell generation module is further configured to generate a final offset factor for each pixel of the plurality of pixels of the plurality of microcells.

18. The printing device of claim 17, wherein the printing controller further comprises:

an input lookup table (InLUT) that is configured to receive a requested output level and to map the received requested output level to a normalized requested output level, wherein a range of the normalized requested output level is equal to a range of the final offset factors.

19. The printing device of claim 18, wherein the printing controller further comprises:

a compare and replacement module that is configured to receive the normalized requested output level from the InLUT, and to determine a final normalized requested output level based at least in part on a comparison of the normalized requested output level with a high threshold value and a low threshold value.

20. The printing device of claim 19, wherein the printing controller further comprises a halftone image generation module configured to:

receive (i) for each pixel of the plurality of pixels, a corresponding final offset factor, and (ii) a final normalized requested output level;

for each microcell of the plurality of microcells, generate a corresponding build-up table; and for each microcell of the plurality of microcells, darken pixels included in the microcell based at least in part on the generated build-up table, thereby generating a halftone image.

21. A method comprising:

forming an array comprising a plurality of microcells, each microcell of the plurality of microcells including a plurality of pixels;

for each pixel in each of the plurality of microcells, determining a respective final offset factor, thereby generating a plurality of final offset factors corresponding to the plurality of pixels, wherein for each pixel in each of the plurality of microcells, the respective final offset factor is a concatenation of a respective pixel offset factor and a microcell offset factor;

receiving a requested output level that is representative of a color level of a portion of a continuous tone image;

mapping, using an input lookup table (InLUT), the received requested output level to a normalized requested output level, wherein a range of the normalized requested output level is equal to a range of the plurality of final offset factors; and for each pixel in each of the plurality of microcells, assigning (i) the respective pixel offset factor that is associated with a relative position of the pixel in the respective microcell, and (ii) the respective microcell offset factor that is associated with an index of the respective microcell.

22. The method of claim 21, further comprising:

generating the InLUT such that individual entries of the InLut is a concatenation of a respective pixel offset factor and a microcell offset factor.

23. The method of claim 21, wherein the entries of the InLUT are monotonic, such that any relatively higher numbered entry of the InLUT is associated with a gray level of a halftone image that is not relatively lighter compared to a gray level associated with any relatively lower number entry of the InLUT.

* * * * *